United States Patent [19]
Nawathe et al.

[11] Patent Number: 5,647,986
[45] Date of Patent: Jul. 15, 1997

[54] APPARATUS AND PROCESS FOR DISTRIBUTED TREATMENT OF WASTEWATER

[76] Inventors: Dilip Nawathe, 210 Brittany Ct., Duluth, Ga. 30136; Rocky R. White, P.O. Box 1884, Lilburn, Ga. 30226

[21] Appl. No.: 348,592

[22] Filed: Dec. 2, 1994

[51] Int. Cl.$^6$ .................................................. C02F 3/20
[52] U.S. Cl. ...................... 210/608; 210/614; 210/624; 210/195.3; 210/626
[58] Field of Search ................................. 210/608, 614, 210/620, 623, 626, 628, 195.1, 195.3, 202, 220, 221.2, 259, 624

[56] References Cited

U.S. PATENT DOCUMENTS

| | | |
|---|---|---|
| 2,812,976 | 11/1957 | Hasenkamp . |
| 3,875,051 | 4/1975 | Kovarik . |
| 3,892,659 | 7/1975 | Kirk . |
| 3,956,137 | 5/1976 | Dempsey . |
| 4,246,101 | 1/1981 | Selby . |
| 4,655,925 | 4/1987 | Tabata et al. .................. 210/628 |
| 4,810,386 | 3/1989 | Copa et al. .................. 210/626 |
| 4,826,601 | 5/1989 | Spratt . |
| 4,880,533 | 11/1989 | Hondulas . |
| 4,897,196 | 1/1990 | Copa et al. .................. 210/626 |
| 4,919,814 | 4/1990 | Carnahan . |
| 4,952,316 | 8/1990 | Cooley .................. 210/626 |
| 4,986,905 | 1/1991 | White . |
| 5,228,796 | 7/1993 | Lansdell .................. 210/624 |

OTHER PUBLICATIONS

"Advanced Environmental Systems" brochure, 1992.

*Primary Examiner*—Christopher Upton

[57] ABSTRACT

An automated wastewater treatment miniplant intended for installation and use with individual residences. Wastewater such as raw sewage is received in a settling tank to remove suspended solids, and then flows to an intermediate tank where the sewage is aerated and churned to promote aerobic treatment of organic materials in the sewage. When the wastewater in the intermediate tank reaches a predetermined level, a batch of that wastewater is transferred to an aerator-clarifier tank where further aerobic treatment of the batch wastewater occurs under controlled conditions, without dilution with incoming wastewater. Further aerobic decomposition of the wastewater takes place in the aerator-clarifier tank. Sludge is allowed to settle in that tank, and supernatant liquid within that tank is periodically withdrawn for dispersal in a drain field. Sludge is periodically returned to the intermediate tank to augment the biomass in that tank. Some sludge is periodically wasted from the system. The wastewater treatment miniplant optionally includes a separate tank for receiving and disinfecting supernatant liquid withdrawn from the aerator-clarifier tank. That disinfected liquid is dispersed in an underground irrigation field or in a drain field. The miniplant is automated under microprocessor control, and can report faults to a central location and exchange other information with the central location.

42 Claims, 22 Drawing Sheets

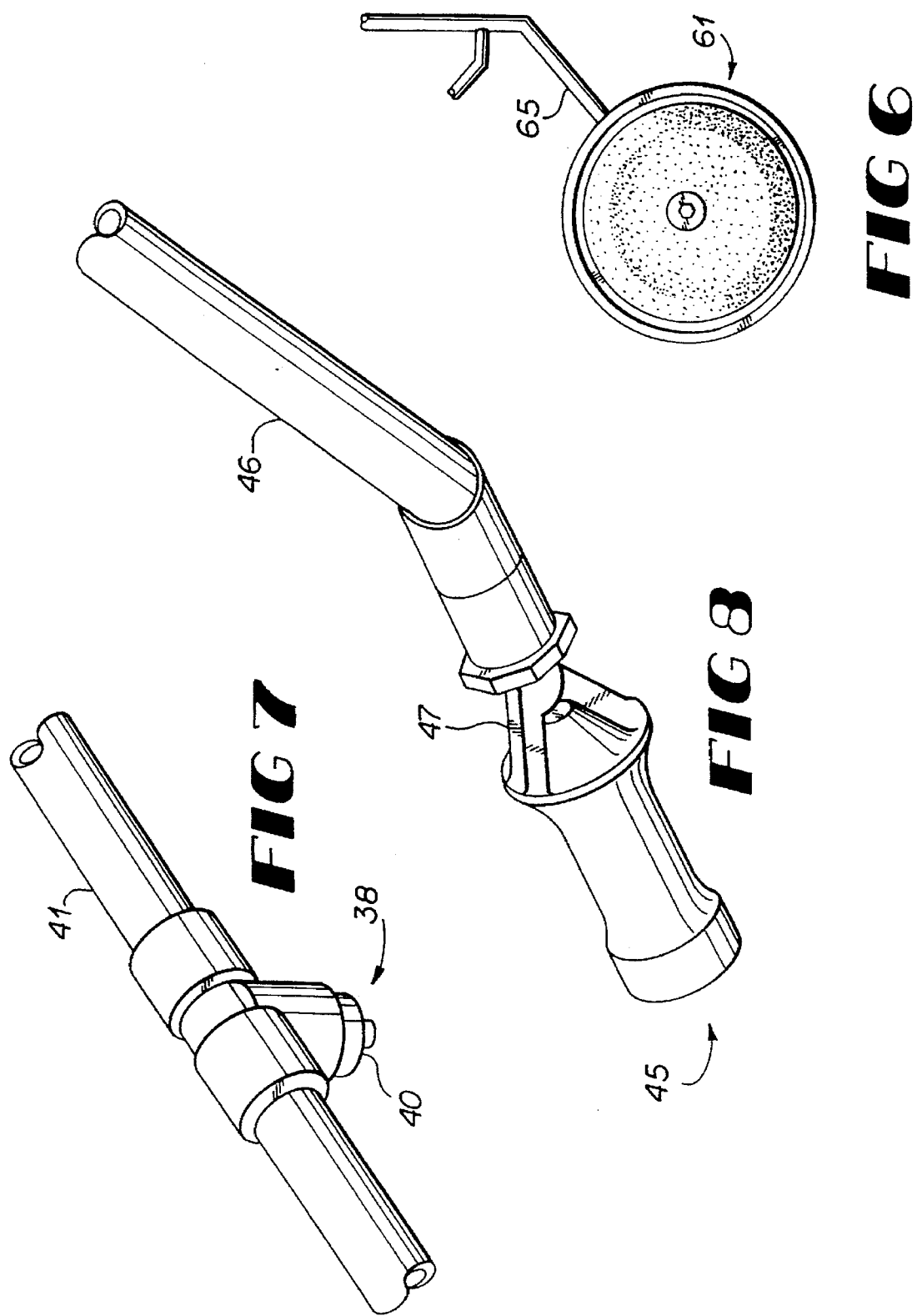

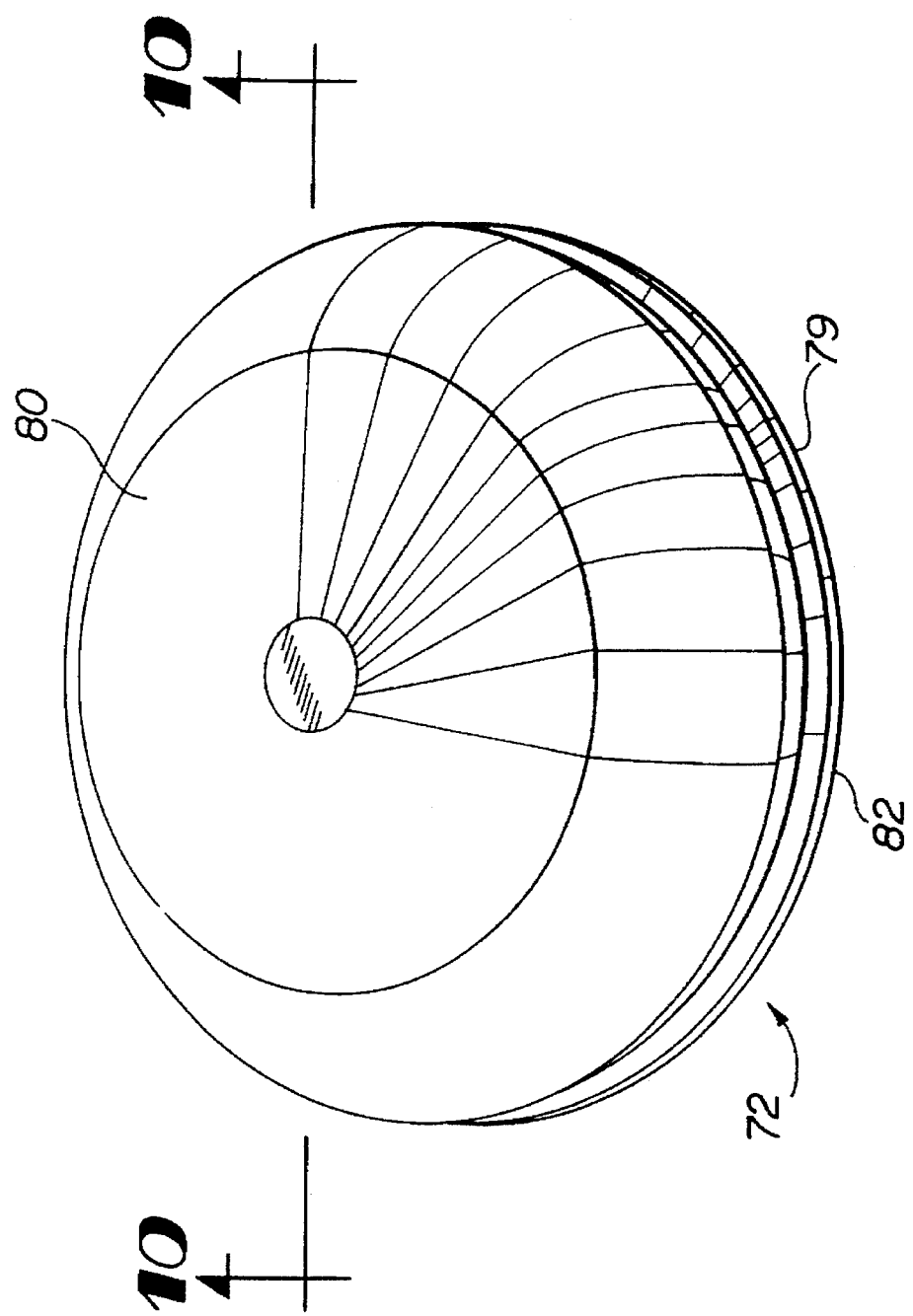

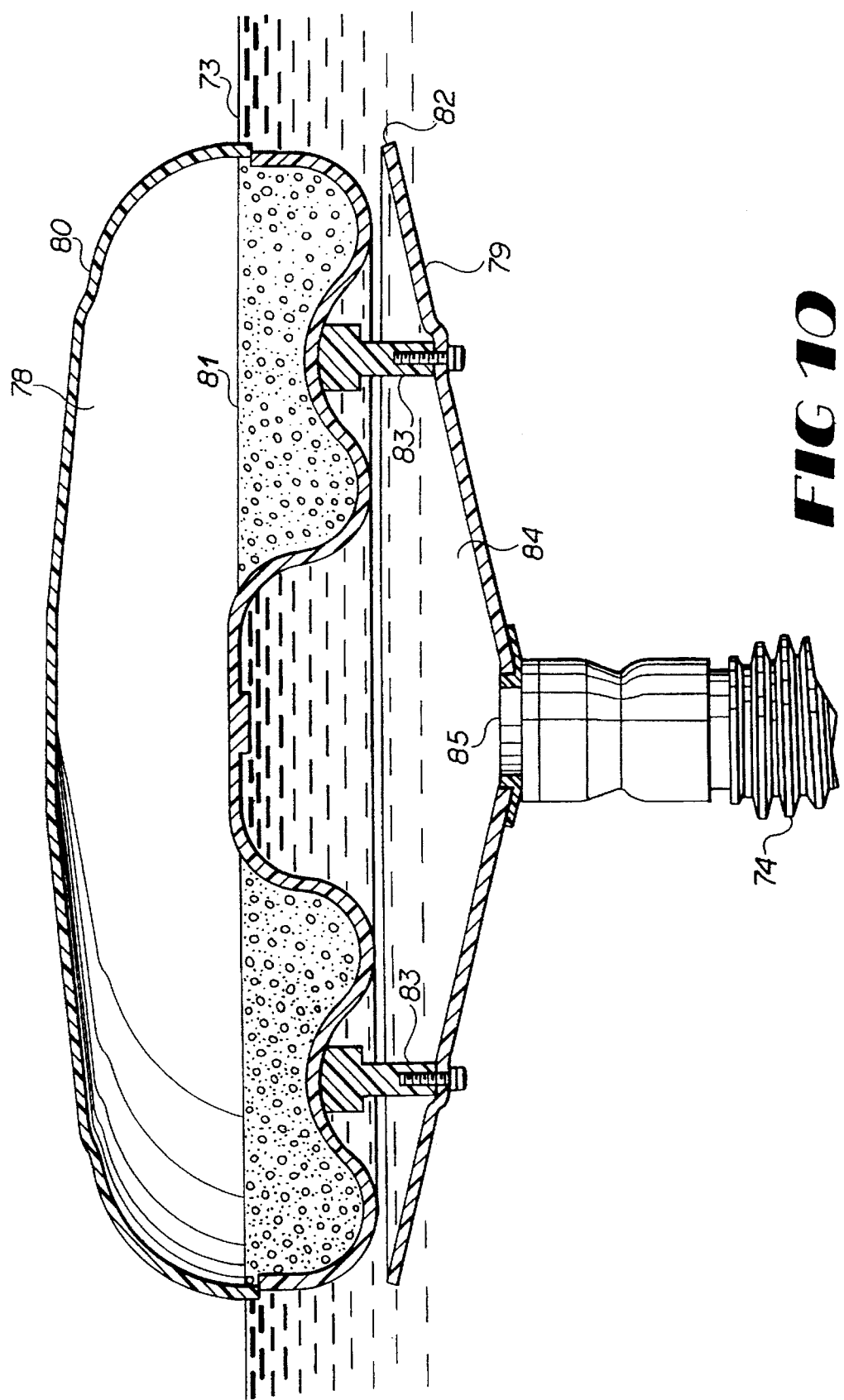

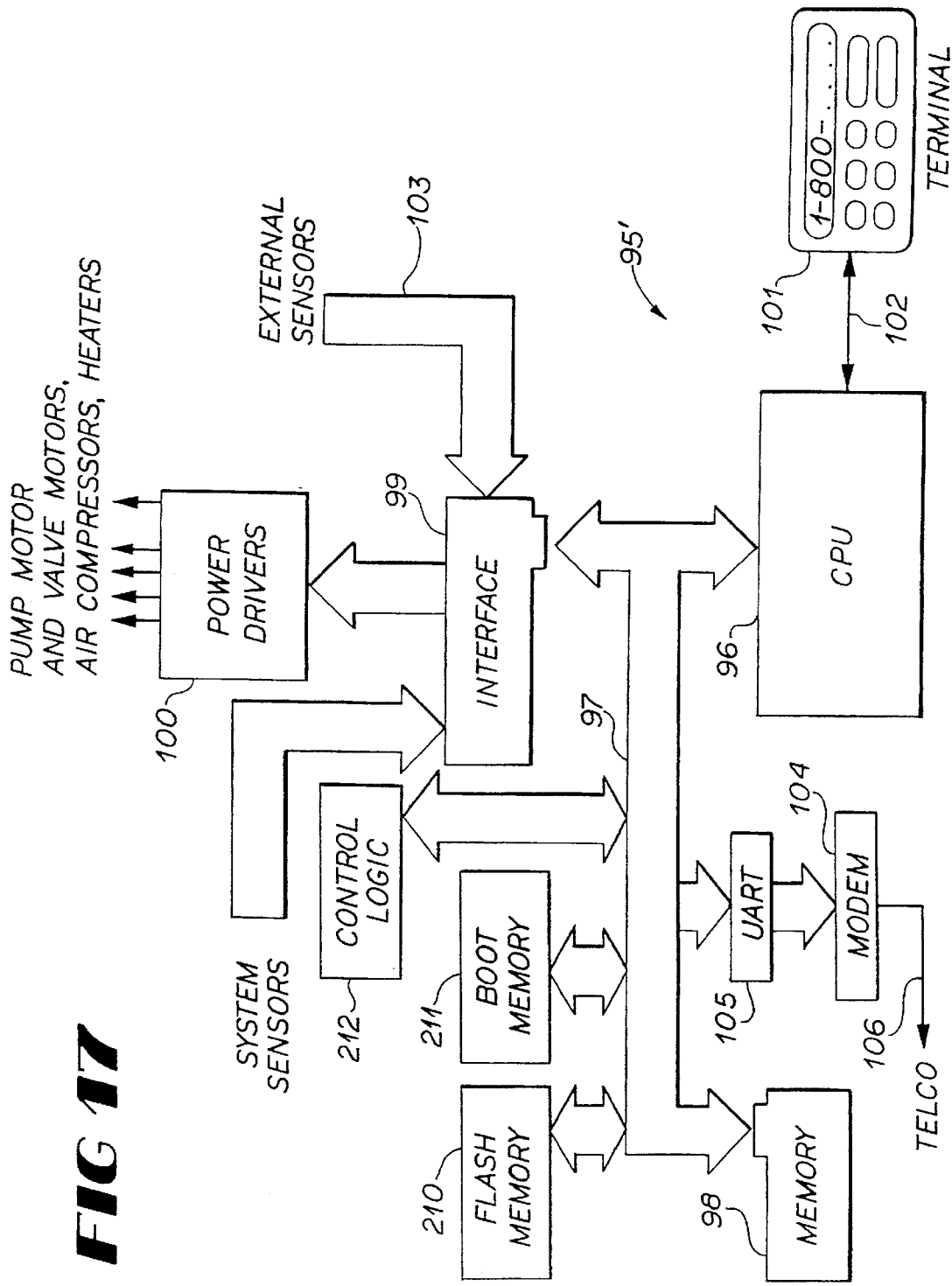

(To Fig. 18B)

APPARATUS AND PROCESS FOR DISTRIBUTED TREATMENT OF WASTEWATER

FIELD OF THE INVENTION

This invention relates in general to wastewater treatment and for control of residential and commercial buildings; and relates in particular to an apparatus and process for treating organic wastes from individual residential and commercial sites, for remote monitoring and programming of such treatment plants and processes, for remote monitoring of other events such as security conditions and utility usage at the sites, and for transferring other information to and from the sites.

BACKGROUND OF THE INVENTION

Many localities are experiencing a severe strain in the operation of their municipal wastewater treatment plants, due to increased load from rapid commercial and residential development. Furthermore, the movement of population and industry to unsewered areas has resulted in numerous sewage and waste disposal problems which cannot be resolved by the traditional methods of absorption in the ground. The discharge of untreated wastes from homes can lead to many environmental problems. The discharge of sewage containing potentially disease-causing microorganisms constitutes a hazard to public health. Organic matter in sewage serves as a food source for various microorganisms such as bacteria which uses oxygen to break down the organic matter. Large concentrations of organic matter thus can result in the depletion of dissolved oxygen in receiving streams to such an extent that fish and other aquatic organisms cannot survive.

To protect the environment and public health, sewage treatment is necessary. The two traditional methods of treating home wastes have been the sewer collection system with a central treatment plant, and the individual septic tank with an absorption field. However, the low population density of many rural areas makes sewer construction too expensive for the average rural household. In the rapidly-growing counties and other areas, it is not always possible to keep up with the pace of development by adding to the capacity of existing central sewage treatment plants. Adding to these problems, shallow soil depths, steep slopes, high ground water levels, and impermeable soils in many areas result in septic tank-absorption field failures. Many developing suburban areas in the United States have banned the use of conventional septic tank-absorption field techniques for new housing construction. However, some municipalities have declared a moratorium on the issuance of residential building permits, or will issue such permits only where the individual lot size exceeds a certain minimum square footage, because the existing central sewage treatment plants already are operating at or near capacity. The outright refusal to issue residential building permits, or the issuance of those permits only for larger lots, drives up the prices of existing residences or inflates the cost of new housing in areas having such restrictions imposed by a scarcity of residential wastewater treatment facilities or restricted use of conventional septic tanks.

SUMMARY OF THE INVENTION

Stated in general terms, organic sewage from residences or other sites is treated by individual sewage treatment miniplants located at the sites, instead of connecting each site to a conventional septic tank or installing sewer lines leading from the sites to a central treatment facility. A municipality thus may require, as a condition for issuing building permits, that each residence built in a particular subdivision or other locality be equipped with an individual sewage treatment miniplant suitable for processing the wastewater expected from the residence, instead of providing the centralized sewage treatment facility for handling the wastewater from all such residences and requiring the builder or developer to install conventional sewer lines from each residential or other site to the central facility. In such cases, it is envisioned that the municipality could levy a periodic charge on the property owners in lieu of the conventional sewer usage fee, and that levy could include the cost of maintaining the individual miniplants. By eliminating sanitary sewers, the present invention also avoids the environmental problems encountered when storm sewers overflow into conventional sanitary sewers during storm surges.

Sewage treatment miniplants according to the present invention are microprocessor controlled, and the miniplants preferably can communicate with a central facility to report a malfunction or other abnormal event associated with the miniplant. This communication capability also facilitates reprogramming the microprocessor from the central facility, reporting other events such as intrusion or smoke detected at the site with the aid of suitable sensors connected to the microprocessors, and two-way transfer of other information between individual sites and the central facility or beyond.

At the site of a sewage treatment miniplant according to the present invention, organic wastewater from a residence or other source at the site flows into a primary settling tank and overflows from that tank into an intermediate tank. Principal aerobic treatment of the wastewater commences in the intermediate tank, which the wastewater enters in continuous flow, and a batch of the wastewater is transferred to an aerator-clarifier tank where the batched wastewater undergoes further aerobic treatment and clarification. Sludge settles to the bottom of the aerator-clarifier tank during clarification of the batched wastewater, leaving a clear supernatant liquid above the sludge. This supernatant liquid is periodically removed from the aerator-clarifier tank, either for dispersal or for disinfection to kill any possible bacteria remaining in the supernatant liquid. The supernatant liquid removed from the aerator-clarifier tank, with or without further treatment to disinfect the liquid, may be dispersed by a drain field or may be utilized for irrigation.

During the aerobic treatment and clarification phase of a batch of wastewater according to the present invention, no influent enters the aerator-clarifier tank unless the intermediate tank becomes filled nearly to overflow. Treatment within the aerator-clarifier tank thus takes place in a batch mode of operation, allowing better control of the process and insuring good effluent quality from the aerator-clarifier tank. The sludge settled at the bottom of the aerator-clarifier tank is rapidly returned to the intermediate tank several times during the clarification phase, to help build the proper biomass in the intermediate tank and also to prevent any denitrification in the aerator-clarifier tank. A predetermined amount of sludge is periodically wasted or removed from the intermediate tank, to maintain a desired solids retention time (SRT) or sludge age in the process. The present system accomplishes the sludge wasting, as well as other monitoring and control functions, automatically under computer control, eliminating the responsibility of the homeowner to regularly monitor the functioning of the sewage treatment plant.

The influent to the present system preferably first enters the primary settling tank, in which readily settleable solids including grit will settle out and scum and floatable material are retained. Some degree of aerobic and biological treatment of the raw sewage also occurs in the settling tank. Liquid outflow from the primary settling tank flows by gravity to the second or intermediate tank on a continuing basis. The present system thus operates in a hybrid continuous- and batch-mode fashion, with settling and initial aerobic treatment of the wastewater taking place in a continuous mode and with subsequent aerobic treatment and clarification, and optional disinfection of the supernatant liquid removed from the aerator-clarifier tank, taking place in a batch mode for improved control of the system.

Stated somewhat more specifically, the present invention initially receives influent, such as raw sewage, in a settling tank, in which readily settleable solids will settle out. The settling tank thus removes a significant amount of the suspended solids in the raw sewage. The overflow from the settling tank flows to an intermediate tank, preferably by a gravity drain having an inlet located at a preferred uppermost level of liquid in the settling tank. Baffles and weirs are used in the settling tank to prevent any solids or floating material from entering the intermediate tank. The effluent from the settling tank preferably flows continuously to the intermediate tank, which functions as a first aeration tank for the wastewater in the present system. Proper mixing and churning of the wastewater in the intermediate tank is achieved by periodically pumping out the wastewater from that tank and returning the discharge to the same tank. Wastewater in the intermediate tank is aerated until the wastewater reaches a predetermined upper operating level within the tank. The aeration cycle in the intermediate tank preferably is controlled so as to achieve nitrate removal from the wastewater. When that level is reached in the intermediate tank, a programmed controller operates a pump and opens certain valves to start transferring the wastewater from the intermediate tank to a third tank, known as the aerator-clarifier tank. The liquid level in the aerator-clarifier tank is monitored, and the controller stops transferring wastewater to the aerator-clarifier tank when that tank is full.

The aerator-clarifier tank accomplishes a second stage of aeration in the batch of wastewater pumped to that tank, and for clarification of the wastewater batch. Once the aerator-clarifier tank receives a predetermined batch of wastewater, no further influent enters that tank during the second-stage aeration and clarification of that batch.

When a batch of wastewater is transferred from the intermediate tank to the aerator-clarifier tank, aeration of that batch commences by pumping air into the tank. The wastewater in the intermediate and aerator-clarifier tanks may be heated, especially during winter, to maintain an optimum rate of biological activity. After the wastewater in the aerator-clarifier tank is aerated for a predetermined time, the aeration is stopped and that wastewater is allowed to stand still for a time to enable the scum to separate and float to the surface in that tank. At that time, scum on the surface of the liquid in the aerator-clarifier tank is removed.

After the scum from the surface liquid is removed from the aerator-clarifier tank, a period of clarification commences for the wastewater remaining in the aerator-clarifier tank. This clarification preferably takes place in several stages for more effective separation of the biomass, and for proper thickening of the sludge formed in the aerator-clarifier in preparation for returning that sludge to the intermediate tank. At the first stage of operation, the batched wastewater in the aerator-clarifier tank is aerated for a time and then is allowed to stand still for a time. This standing period allows sludge formed by aerobic treatment within the aerator-clarifier tank to settle and thicken at the bottom of that tank. When the end of the settling period is reached, a quantity of the clear supernatant liquid remaining above the settled sludge is pumped from the aerator-clarifier tank. This supernatant liquid preferably is removed from the top of the liquid in the aerator-clarifier tank, to avoid disturbing the settled sludge beneath that liquid. After removing a predetermined amount of the supernatant liquid, a quantity of the sludge settled at the bottom of the aerator-clarifier tank is pumped from that tank to the intermediate tank. This rapid removal of the sludge prevents denitrification. Depending on the status of the present system, some of that sludge may be wasted—that is, removed from the system—at this time. The decision to waste some sludge removed from the system is determined by parameters set in the programmed controller, so that sludge wasting occurs automatically and need not require operator intervention. The interior wall of the aerator-clarifier tank preferably is washed by spraying with remaining supernatant liquid in the tank, to prevent sludge from drying and accumulating on the wall. The accumulated sludge thus is returned to the liquid in the aerator-clarifier tank, for settling and eventual removal from that tank.

Once some of the sludge at the bottom of the aerator-clarifier tank is removed from that tank, the stage of clarification is completed. A second stage of clarification now commences, and this second stage may be similar to the first phase just described. The wastewater in the aerator-clarifier tank again is allowed to settle without disturbance for a predetermined time for proper settling and thickening of sludge within that tank. At the end of that time, another quantity of clear supernatant liquid is removed, preferably from the top surface of the liquid in that tank. After removal of the supernatant liquid, the interior wall of the tank again is washed by spraying, and another quantity of sludge at the bottom of the tank is removed and transferred to the intermediate tank or wasted from the system. In a preferred embodiment of the present invention as described below, a third stage of clarification follows the second stage. This third stage may be identical in nature to the second stage, and further clarifies the wastewater by removing supernatant liquid that remains following further settling and thickening of sludge from the wastewater in the aerator-clarifier tank.

After the sludge is transferred from the aerator-clarifier tank at the end of the last clarifier stage, a small amount of clear supernatant preferably remains in that tank. This remaining liquid maintains prime in the pump associated with the system, and again is used to scrub the walls of the aerator-clarifier tank by spraying the supernatant on the interior wall of the tank. The scum removed from the tank wall will float to the surface of the next batch of wastewater transferred to the aerator-clarifier tank, and will be removed from that liquid as discussed above.

The intermediate tank also preferably is scrubbed after the final stage of each clarifier cycle. This scrubbing preferably includes pumping a jet of liquid directed toward the bottom of the intermediate tank to help mix the biomass in the tank and maintain that biomass in a suspended state. The inner wall of the intermediate tank also is cleaned by periodically spraying with liquid, preventing sludge on the wall from drying and returning the accumulated sludge to the liquid in the tank.

After the aerator-clarifier tank has been cleaned following the end of batch clarification as mentioned above, that tank is ready to receive another batch of wastewater from the intermediate tank for aeration and clarification. That next batch of wastewater is transferred when the level of wastewater in the intermediate tank again reaches a predetermined fill level as previously described.

The clear supernatant liquid removed from the aerator-clarifier tank in most cases is of sufficient quality for subterranean dispersal by means of a conventional drain field or other inground dissipation techniques. Alternatively, the removed supernatant liquid can be supplied to a subsurface irrigation system, thereby reusing the water for irrigation of lawns and gardens.

The present system also contemplates optional treatment of the supernatant liquid from the aerator-clarifier tank to completely remove the bacteria from that liquid. This optional disinfection takes place in a fourth tank known as the disinfection tank, into which is pumped the supernatant liquid removed from the aerator-clarifier tank. The supernatant is mixed with a disinfectant during the transfer from the aerator-clarifier tank to the disinfection tank. One class of appropriate disinfectant is chlorine compounds, which will kill most of the bacteria remaining in the supernatant liquid. An appropriate contact time of the supernatant liquid and the disinfectant within the disinfection tank is provided, and compressed air is introduced into that tank to mix the supernatant with the disinfecting solution. The disinfected water then is pumped from the tank and may be used for underground irrigation or otherwise dissipated.

Accordingly, it is an object of the present invention to provide an improved apparatus and process for treating wastewater.

It is another object of the present invention to provide an improved apparatus and process for treating organic wastes.

It is still another object of the present invention to provide an improved apparatus and process for treating wastewater from individual sites.

It is a further object of the present invention to provide an improved apparatus and process for treating wastewater from individual homes or small groups of residences.

It is still another object of the present invention to provide a wastewater treatment apparatus and process operating under programmed control, so that no operator intervention is required.

It is yet a further object of the present invention to provide a wastewater treatment apparatus and process suitable for individual residences, yet operating at least partially in a batch mode for improved control of wastewater clarification.

It is another object of the present invention to provide a wastewater treatment apparatus that will run the process efficiently by remote reprogramming of the onsite systems according to their unique requirements.

It is still another object of the present invention to provide a system of the kind described and capable of receiving or sending other information over a compatible data channel.

The foregoing and other objects and advantages of the present invention will become more apparent from the following detailed discussion of the preferred embodiments.

BRIEF DESCRIPTION OF DRAWINGS

FIG. 6 is an enlarged view showing one of the aerators present in the intermediate and aerator/clarifier tanks.

FIG. 7 is an enlarged pictorial view of the spray nozzle present in the intermediate and aerator/clarifier tanks.

FIG. 8 is an enlarged pictorial view of an internal mixer present in the intermediate and aerator/clarifier tanks.

FIG. 9 is a pictorial view of the float in the aerator-clarifier tank.

FIG. 10 is a section view along line 10—10 of FIG. 9.

FIG. 17 is a block diagram showing a modification of the program controller in FIG. 4, used for automatic reprogramming of the system.

DETAILED DESCRIPTION OF PREFERRED EMBODIMENTS

Biological treatment is the most important step in processing wastewater, and a brief discussion of that treatment is helpful in understanding the present apparatus and process. Physical treatment of raw wastewater by sedimentation removes only about 35% of the biological oxygen demand (BOD), due to the high percentage of nonsettleable solids in domestic wastes. The present system, like most municipal wastewater treatment plants, uses the aerobic suspended growth treatment method. The extended aeration process employed by the present invention generates high-quality effluent with low BOD and suspended solids.

There are two kinds of solid in liquid wastes, organic and inorganic solids. Inorganic solids do not break down or decompose by biological treatment. The inorganic solids content in most wastewater is small. Aerobic biological treatment processes, used by the present system, are living systems that rely on mixed biological culture to break down the organic wastes. The present sewage treatment system must, therefore, grow and maintain in suspension a high population of bacteria, i.e., a biomass, in order to consume the organic waste. Under aerobic conditions, the reduced organic compounds are oxidized to end products of carbon dioxide and water.

The growth and survival of nonphotosynthetic microorganisms depend on their ability to obtain energy from metabolism of the organic wastewater substrate. An aerobic process results in complete metabolism and synthesis of the substrate, ending in a large quantity of biological growth. A secondary feature of the process is nitrification of ammonia in the waste and the significant reduction of pathogenic organisms.

Figure 1:
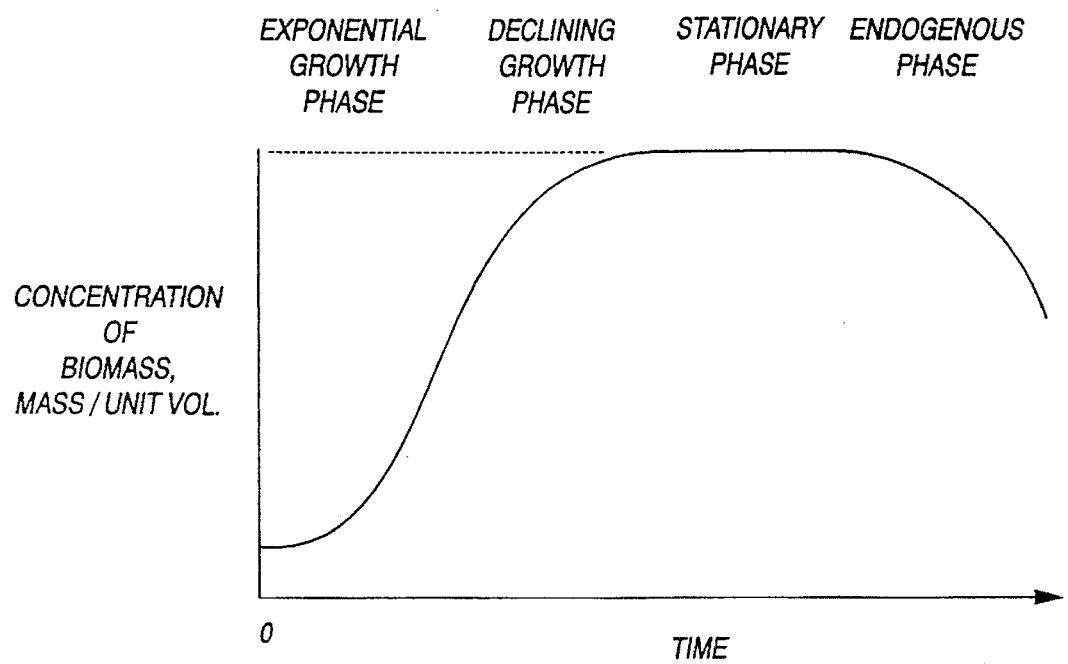
FIG. 1 is a chart illustrating the growth pattern of biomass in the aerobic biological treatment process of the present invention.

The characteristic growth pattern for bacteria is shown in FIG. 1, where the concentration of biomass on the vertical axis is charted as a function of time on the horizontal axis. After a short lag period for adaptation to the new environment, the bacteria reproduce by binary fission, exponentially increasing the number of viable cells and biomass in the culture medium. This is the exponential growth phase shown in FIG. 1. The rate of metabolism in the exponential growth phase is limited only by the ability of the microorganisms to process the organic substrate.

The declining growth phase shown in FIG. 1 is caused by an increasing shortage of the substrate. The rate of reproduction of the microorganisms decreases, and the growth of bacteria in this phase is a function of both the concentration of the microorganisms and concentration of the growth-limiting substrate. The declining growth phase is followed by the stationary phase where the concentration of biomass reaches a maximum value, and where the low concentration of remaining substrate limits the biomass growth rate substantially to the depletion rate of microorganisms in the biomass.

In the endogenous growth phase shown in FIG. 1, viable bacteria are competing for the small amount of substrate still in the wastewater undergoing treatment. Starvation of the bacteria occurs, such that the rate of death exceeds the rate of reproduction. The concentration of biomass in the solution thus declines during the endogenous phase of bacteria growth.

Wastewater treatment according to the present invention takes place in three stages: primary settling or sedimentation, biological aeration to consume the organic waste, and clarification to separate the suspended solids from the supernatant that can be dispersed by a drain field or other means. Primary sedimentation removes approximately 30–50% of the suspended solids in raw sewage. This step removes the gross solids such as grease, trash, garbage grindings, and so on. Primary treatment by sedimentation reduces problems associated with floating debris in the wastewater.

Aerobic suspended growth treatment systems, such as the present system, must grow and maintain in suspension a high population of bacteria in order to consume the organic waste. Although individual bacteria grow rapidly, as illustrated in FIG. 1, it takes time to increase the originally-low concentration of bacteria to levels high enough to rapidly degrade the organic waste. A common design concept for aerobic suspended growth systems is solids retention time (SRT), which is the average time the bacteria spends in the system. Typical SRT values for systems such as the present one are 20–100 days. SRT values at the high end of that range may give operational problems; the excessive build up of solids in the system is a common cause of poor effluent quality of aerobic treatment systems. Consequently, it is desirable to waste excessive solids from time to time and the present system accomplishes solids wasting without operator intervention, according to the occurrence of predetermined events.

The SRT relates to the quantity of microbial solids in an extended aeration process, relative to the quantity of solids lost in the effluent and excess solids withdrawn in the waste sludge. The quantity of microbial solids depends on the suspended-solids concentration in the aeration tank, and that concentration in conventional aeration processes ranges from 1,000–6,000 mg/l. The standard activated-sludge processes use bubble air diffusers to provide adequate oxygen transfer and deep mixing. Dissolved oxygen concentration in the aeration tank should exceed 2 mg/l in order to insure a high degree of treatment and a good settling sludge.

Oxygen transfer efficiency is expressed as the percentage of mass of oxygen dissolved in the water, relative to the applied mass of gaseous oxygen. The rate of oxygen transfer from air bubbles admitted by fine bubble diffusers at the floor of the tank is a function of several factors, including the oxygen transfer coefficient of the wastewater, the oxygen saturation coefficient of the wastewater, and the present and saturation concentrations of oxygen.

Figure 2:
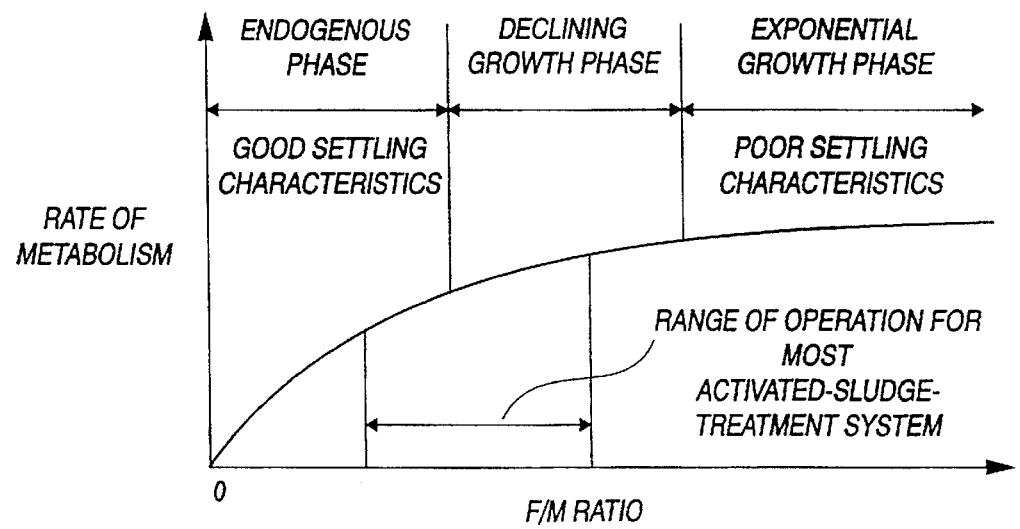
FIG. 2 is a chart illustrating the rate of metabolism of organic matter vs. the food-to-microorganism (F/M) ratio in the aerobic biological treatment process of the present invention.

In the aerator-clarifier tank, metabolism of the organic matter in the wastewater results in an increased mass of microorganisms in the system. Excess microorganisms should be removed or wasted from the system to maintain a proper balance between food supply and the mass of microorganisms in the aerator-clarifier tank. This balance is referred to as "food-to-microorganism ratio" (F/M). The F/M ratio maintained in the aerator-clarifier tank defines the operation of an extended aeration system. FIG. 2 illustrates how an increasing F/M ratio affects the rate of metabolism. Although the exponential growth phase shown in FIG. 2 is desirable for maximum rate of removal of organic matter, in this phase the microorganisms are in dispersed growth and they do not settle out of solution by gravity. Moreover, there is excess unused organic matter in solution which cannot be removed and thus passes out in the effluent. Operation at a high F/M ratio thus results in poor BOD removal efficiency.

At a low F/M ratio, the overall metabolic activity in the aeration tank is endogenous. In this phase the metabolism of the organic material is nearly complete and the microorganisms flocculate rapidly and settle out of solution by gravity. The operation in the endogenous phase is desirable where a high BOD removal efficiency is desired.

Clarification may be defined as separating the biomass from the treated effluent. Aerobic suspended growth treatment systems should retain the bulk of bacteria in the system, usually by settling out the biological solids in a clarifier tank, thickening those solids, and returning them to the aeration tank. The overflow rate of the clarifier relates to the ability to separate suspended solids from the clarifier supernatant; in an actual embodiment of the present invention, this value is 200–400 gal/day/ft$^2$, where "ft$^2$" is the surface area of liquid in the clarifier tank. As mentioned previously, the overall metabolic activity should be in the endogenous phase, that is, the F/M ratio should be low, so that the microorganisms flocculate rapidly and settle out of solution by gravity. The good settling characteristics exhibited by activated sludge in the endogenous phase make the operation in this growth period desirable where a high BOD removal efficiency is desired. The present system insures a low F/M ratio by further aerating the wastewater in the aerator-clarifier tank. After achieving a desirably low F/M ratio to insure a good settling characteristic in that tank, the clarification process begins. As pointed out below, this clarification process preferably includes several discrete stages of clarification, with supernatant liquid being removed from the aerator-clarifier tank and excess sludge being removed from that tank during each clarification stage.

Another important parameter relating to the clarifier is the solids loading. Solids loading relates to the ability of the clarifier to thicken the solids in preparation for returning them to the aeration tank. The desired range for solids loading is 20–30 lb/day/ft$^2$. Excessively long retention times for settled sludges in the clarifier may result in gasification and flotation of the sludge. Scum and other floatable material not properly removed from the clarifier surface at the onset of clarification greatly impairs the effluent quality.

Figure 3:
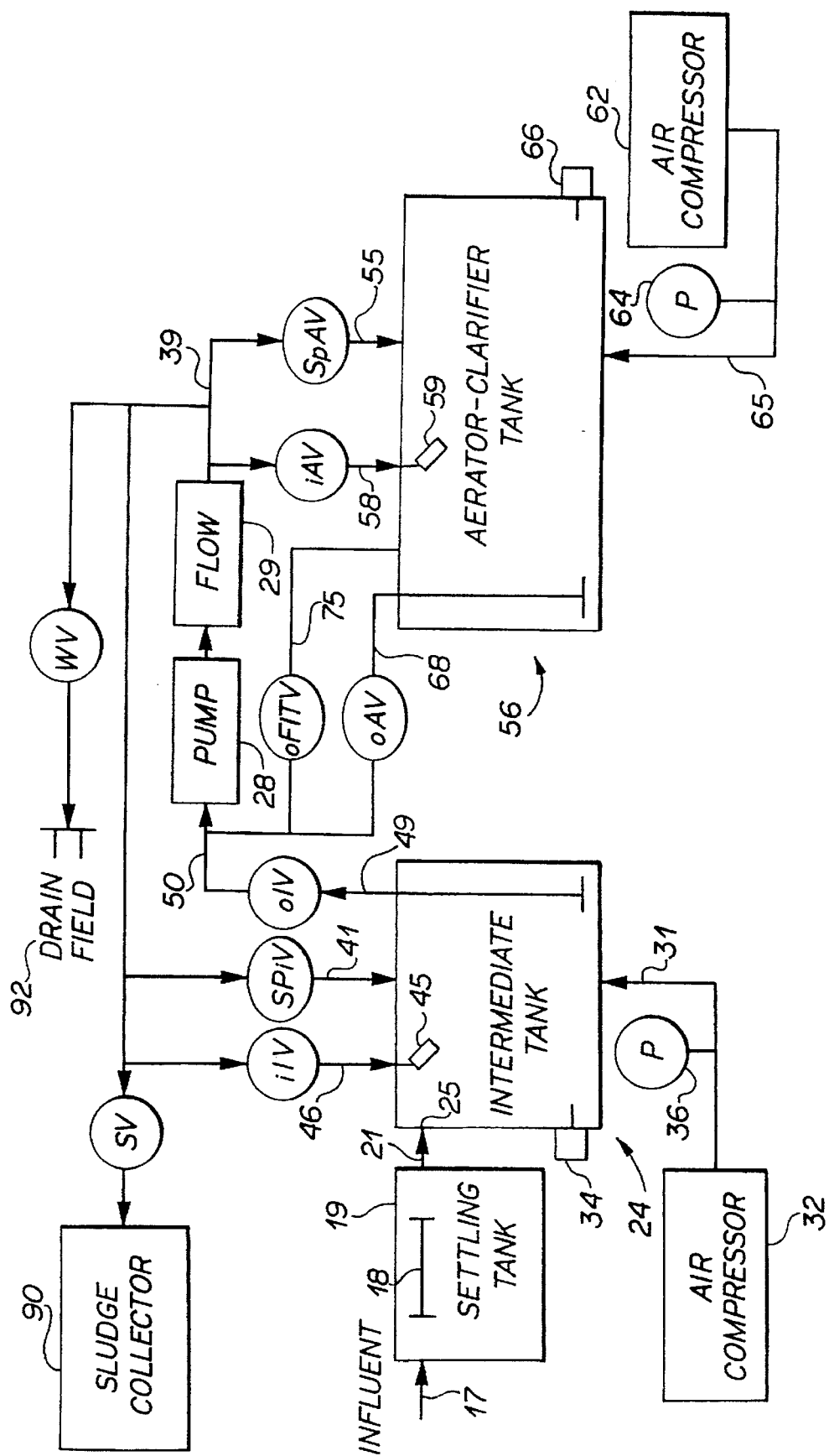
FIG. 3 is a schematic diagram of sewage treatment apparatus according to a preferred embodiment of the present invention.

With the foregoing discussion in mind, a first preferred embodiment of apparatus according to the present invention is schematically shown in FIG. 3. In that embodiment, wastewater in the form of raw sewage is supplied as influent to an underground settling tank 16. In this settling tank, readily settleable solids including grit settle out to the bottom of the tank, and scum and floatable material are retained within the tank. Some degree of an aerobic and biological treatment of organic constituents in the influent also naturally occurs in the settling tank. The settling tank 16 typically removes 30–50% of the suspended solids in the raw sewage influent to that tank. The settling tank 16 preferably includes a baffle assembly 18 near the top of the tank, interrupting a direct path between the influent connection 17 to the settling tank and the outlet 19, through which the overflow from the settling tank flows by gravity along the effluent line 21 from the settling tank to an intermediate tank 24. The outlet 19 is located near the top of the settling tank 16 as is conventional with septic tanks, so that the overflow from the settling tank consists of surface wastewater near the top of that tank.

The effluent line 21 from the settling tank 16 enters the intermediate tank 24 at an inlet opening 25 preferably located near the upper end of the intermediate tank. The effluent line 21 should be pitched downwardly toward the inlet opening 25 so that the effluent from the settling tank 16 flows by gravity into the intermediate tank. The effluent from the settling tank thus flows continuously to the intermediate tank, which functions as a first aeration tank. The intermediate tank 24 in a preferred embodiment of the present invention has a 700 gallon capacity, and the system preferably operates in a manner explained below so that the wastewater level in the intermediate tank fluctuates between 270 and 540 gallons. The extra 160-gallon capacity in the intermediate tank provides a reserve to accommodate occasional peak-flow demands. The wastewater in the intermediate tank 24 is aerated until the water level reaches a predetermined upper operating level (540 gallons, in the present embodiment), whereupon a system controller starts the pump 28 to initiate wastewater transfer from the intermediate tank 24 to an aerator-clarifier tank 30. Transfer of wastewater to the aerator-clarifier tank 30 is stopped when that tank reaches a predetermined upper level or when the intermediate tank is half empty. Further operational details of the control process, including operation of the pump 28 and the various valves disclosed herein, are described below.

Figure 5A:
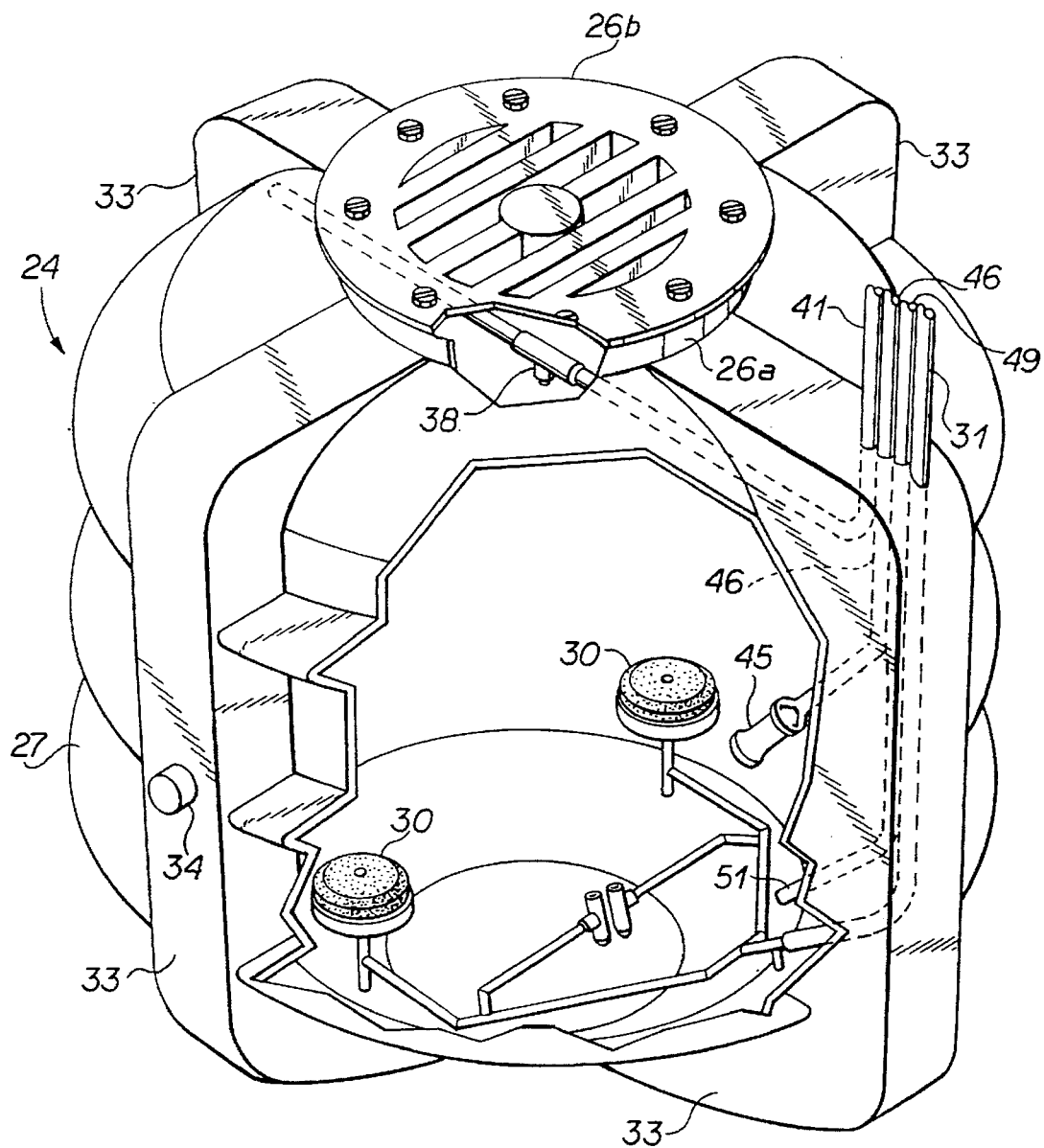
FIG. 5A is a pictorial view, partially broken away for illustration, showing the intermediate tank used in the preferred embodiment.
Figure 5B:
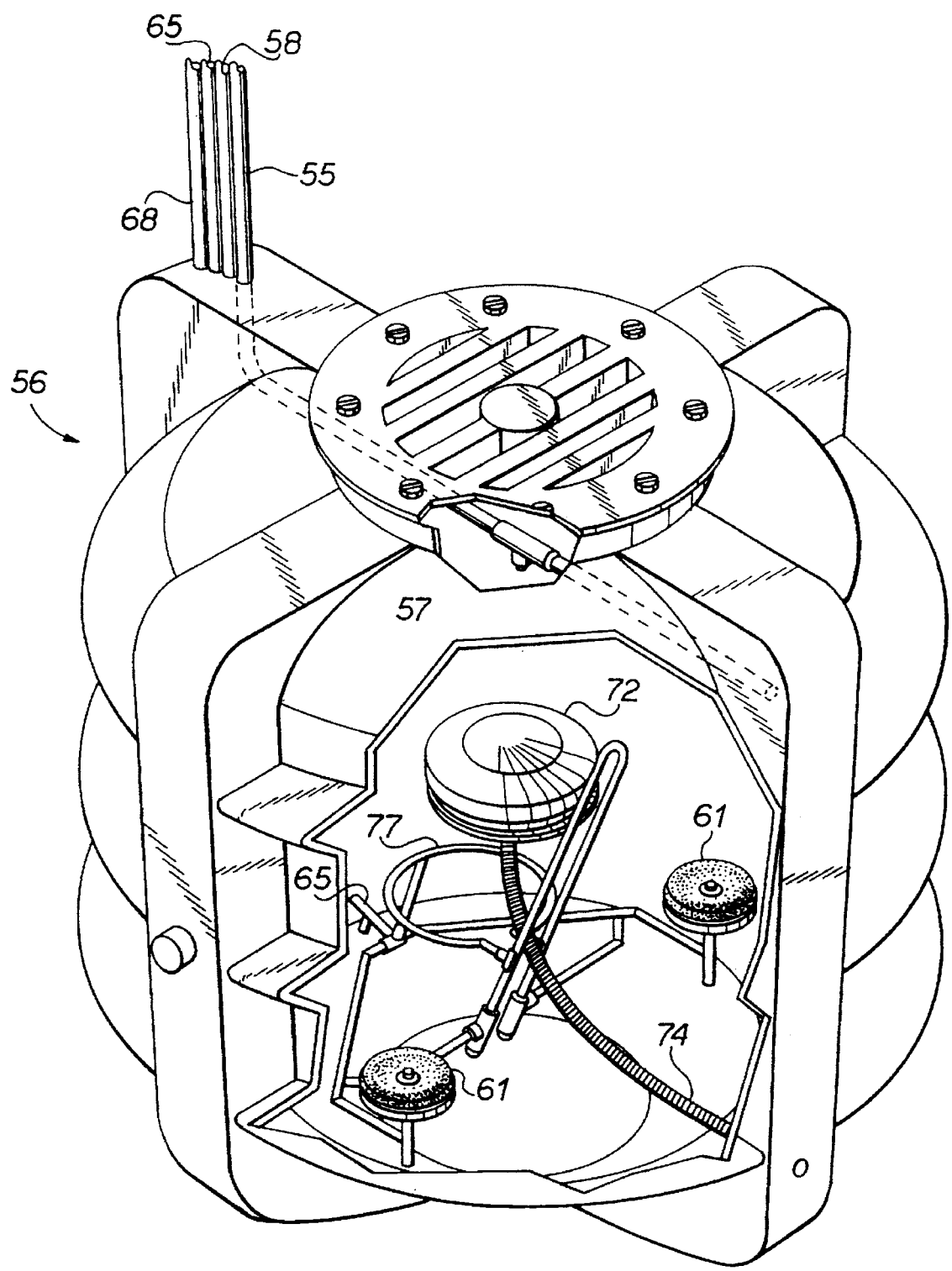
FIG. 5B is a pictorial view, partially broken away for illustration, showing the aerator-clarifier tank used in the preferred embodiment.

FIGS. 5A and 5B show details of the intermediate tank 24 and the aerator-clarifier tank 56 used in the preferred embodiment. Each tank is generally cylindrical relative to its vertical axis, and has at the upper end an access hatch 26a normally closed by a cover 26b. The tanks 24 and 56 are completely buried underground, and preferably are manufactured from a suitable plastic material so as to be relatively light in weight for ease of transporting to the installation site and placement in the ground. The exterior surface of each tank 24 and 56 has a number of molded annular accordion-like ribs 27 which add structural stiffness to the tanks and also help anchor the buried tanks in the soil, thereby overcoming the natural buoyancy of tanks buried in wet soil or below the water table. Each such tank also is reinforced by the four exterior molded vertical ribs 33 extending from the bottom to the top of the tank and intercepting the annular ribs 27; the vertical ribs help each tank withstand the weight of the soil above the buried tank.

To aerate the wastewater in the intermediate tank 24, a number of air diffusers 30 are situated at the bottom of the intermediate tank. These air diffusers are connected through the line 31 to a source of air, such as the air compressor 32, and produce streams of relatively fine air bubbles rising from the bottom of the tank. The wastewater should be at a temperature which optimizes bacterial growth and thus optimizes the aerobic treatment of the wastewater in that tank. It may be necessary in many geographic areas to include an electrically-powered immersion heater 34 inside the intermediate tank 24 to maintain the wastewater at that optimum temperature. That heater preferably is thermostatically controlled and should maintain the wastewater temperature at between 70° F. and 90° F. for maximum bacterial growth within the intermediate tank. However, reduced operating temperatures and the corresponding reduction in the rate of bacteriological activity may be acceptable, although leading to a slight increase in the total system solids (TSS) levels. Because the tanks are buried in the ground, the temperature of wastewater in those tanks is less dependent on climatic temperature variations.

An air pressure sensor 36, FIG. 3, is connected to monitor air pressure in the air line 31 leading to the air diffusers 30 within the tank 24. As discussed below, the sensed air pressure in the line 31 is a function of the level of wastewater within the tank 24 and thus is used as a liquid-level sensor for that tank.

In addition to the air diffuser 30 at the bottom of the intermediate tank 34, that tank has a liquid sprayer 38 (FIGS. 5A and 7) located near the top of the tank and selectively connected to the output side 39 of the pump 28 by the valve SpIV. The sprayer 38 comprises at least one spray nozzle 40 located on a pipe 41 extending across the top of the intermediate tank 24 and leading to the valve SpIV. The spray nozzle 40 directs a high-velocity liquid spray onto the inner wall of the tank and thus is effective to wash that inner wall.

Also within the intermediate tank 24 is an internal mixer 45 located at an inner end of the supply pipe 46 connected to the valve iIV, which in turn is connected to the outlet line 39 of the pump 28. The internal mixer 45, also shown in FIG. 8, operates in a manner known to those skilled in the art by creating a suction to entrain ambient liquid at the inlet side 47 of the internal mixer, when liquid is pumped through the internal mixer. The internal mixer 45 thereby discharges a jet of liquid comprising in part the entrained liquid and in part the liquid pumped to the internal mixer through the line 46. Internal mixers of the kind used in the present apparatus are available, for example, from Pardee Engineering of Berkeley, Calif. The internal mixer 45 preferably is located at least midway below the top of the intermediate tank 24 and is positioned to direct a jet of liquid downwardly toward the bottom of the intermediate tank and at an acute angle relative to vertical, so that operation of the internal mixer intensifies mixing action of wastewater in that tank and scrubs the bottom of the tank.

The intermediate tank 24 also includes a suction line 49 entering at the top of the tank and having its inlet end 51 located near the bottom of the intermediate tank. The suction line 49 connects through a valve oIV to the inlet side 50 of the pump 28.

Batches of liquid within the intermediate tank 24 are selectively transferred to the aerator-clarifier tank 56 as described below. The capacity of the aerator-clarifier tank may be less than that of the intermediate tank 24. In the preferred embodiment, the aerator-clarifier tank has a 400 gallon capacity and a liquid surface area of 19.63 ft$^2$.

Liquid is transferred into the aerator-clarifier tank 56, best seen in FIG. 5B through an internal mixer 59 (FIG. 3) located within the tank 56, by way of the valve iAV and the line 58. The aerator-clarifier tank 56 also has at its top a spray nozzle 57 connected to the line 55 through the valve SpAV. The inlets of the valves SpAV and iAV are connected in parallel to the output 39 of the pump 28. The spray nozzle 57 and the internal mixer 59 within the aerator-clarifier tank 56 are identical to the sprayer 38 and internal mixer 45 of the intermediate tank 24 in their nature, function, and placement within the aerator-clarifier tank.

Air diffusers 61 are situated at the bottom of the aerator-clarifier tank 56. These air diffusers 61 receive air from the air compressor 62, in FIG. 3, and the pressure of that air is monitored by the air pressure sensor 64. As with the intermediate tank 24, the pressure maintained within the air line 65 leading to the air diffusers 61 is a function of the level of liquid within the aerator-clarifier tank 56. The aerator-clarifier tank 56 also preferably has an immersion heater 66 to maintain the wastewater temperature in the tank at a level for optimum biological activity.

A suction line 68 enters the top of the aerator-clarifier tank 56 and has an inlet end located near the bottom of that tank. The drain line 68 is selectively connected, through the valve oAV, to the inlet side 50 of the pump 28, to withdraw sludge from the bottom of the aerator-clarifier tank.

Surface liquid within the aerator-clarifier tank is selectively withdrawn by a floating skimmer 72 within that tank. The skimmer 72, best seen in FIGS. 9 and 10, is buoyant so as to float on the surface 73 of the liquid within that tank. A flexible hose 74 attaches to the bottom of the skimmer 73 and extends downwardly within the aerator-clarifier tank, connecting to the outlet line 75 leading from near the bottom of that tank. The outlet line 75 is selectively connected to the inlet 50 of the pump 28 by way of the valve oFltV. The flexible hose 74 permits the buoyant skimmer 72 to remain at the liquid surface 73 as the level of liquid in the aerator-clarifier tank rises and falls during operation of the system. A hose guide 76 in the shape of an inverted U extends upwardly from the bottom of the tank 56 and constrains the hose 74 for movement in a vertical plane as the skimmer rises and falls with the liquid level within the tank. The hose guide 76 is raked back at an acute angle to vertical as shown in FIG. 5B to accommodate the natural path of the hose 74 as the skimmer rises and falls. The tank 56 preferably includes a cradle 77, which may be located near one side of the hose guide 76, to receive the skimmer 72 when the tank is nearly empty of liquid. The cradle 77 will support the skimmer in a substantially upright attitude above the bottom of the tank, allowing room for the hose 74 connected to the underside of the skimmer.

As best seen in FIGS. 5 and 6, the skimmer 72 is circular and includes a dome-like housing 80 defining an internal buoyancy chamber 78 mounted above a trough 79 and spaced upwardly from the bottom of that trough. The buoyancy chamber 78 is concentric with the hose 74, and a heavy mass 81 occupies a lower portion of the buoyancy chamber as seen in FIG. 6. The weight of the mass 81 and the remainder of the skimmer 72, and the volume of the buoyancy chamber 78, are selected so that the outer rim 82 of the trough 79 is suspended a short distance below the liquid surface 73 within the aerator-clarifier tank 56 as the skimmer 72 floats in that liquid. The mass 81 may, for example, be provided by concrete poured into the lower region of the buoyancy chamber 78, thereby providing the skimmer with sufficient mass to remain relatively stable within the aerator-clarifier tank during turbulence created by operation of the internal mixer 58.

The housing 80 and the trough 79 are mutually spaced apart to define an open region 84 between those elements. The several struts 83 mounted between the trough 79 and the underside of the housing 80 at intervals radially spaced from the central tube, maintain the desired vertical spacing between the buoyancy chamber and the trough. This construction of the skimmer 72, combined with the skimmer buoyancy selected so that the outer rim 82 remains a short distance (for example, about 1 inch) below the liquid surface 73 within the aerator-clarifier tank 56, allows a surface volume of liquid in the aerator-clarifier tank 56 to enter and fill the open region 84 of the skimmer 72.

The flexible hose 74 connects to the central opening 85 at the underside of the skimmer 72. The flexible hose 74 thus communicates with the open region 84 within the skimmer 72, so that a surface layer of liquid within the aerator-clarifier tank 56 can be withdrawn by operating the pump 28 with the valve oFltV opened.

Referring once again to FIG. 3, it is seen that the outlet line 39 from the pump 28 also selectively connects to the sludge collector tank 90 through the valve SV, or to a drain field 92 through the valve WV. The drain field can be a conventional subsurface drain field of the kind commonly associated with conventional septic tanks utilizing perforated pipe buried in a bed of gravel, or alternatively can be constructed using a chamber leach field system such as that available from Infiltration Systems, Inc. of Old Saybrook, Conn. The drain field functions to dissipate into the soil the liquid effluent pumped into the drain field from the aerator-clarifier tank 56.

The sludge collector tank 90 dewaters sludge pumped to that tank and thereby wasted from the system including the aerator-clarifier tank and the intermediate tank. The sludge collector tank is relatively small and is porous on its sides and bottom. Sludge pumped into the sludge digester tank 90 through the line 91 enters at the top of that tank, preferably through a pipe or nozzles aiming the incoming sludge toward the perimeter of the tank to facilitate dewatering of the sludge through the porous sides and bottom of the tank. The sludge collector tank 90 is located underground but should have an access port accessible from above ground, so that a homeowner or service person can open the tank from time to time and remove the dewatered sludge for use as a fertilizer.

The settling tank 16, the intermediate tank 24, and the aerator-clarifier tank 56 also are intended for installation underground, and those tanks should not require routine or periodic servicing. Except for those tanks (and the sludge collector tank 90 and the drain field), all other components of the system shown in FIG. 3 preferably are located above the ground, where those components are readily accessible for servicing. In a preferred embodiment, the pump 28 and flow sensor 29, all the valves, and the air compressors and air pressure sensors associated with the intermediate tank and the aerator-clarifier tank, preferably are mounted on a common platform that rests on a ground-level support pad near the underground tanks. A removable housing rests on the platform and encloses the valves and other operating elements of the system, and that housing preferably is insulated to keep the above-ground components from freezing in cold climates. The warmth of the wastewater being pumped through the above-ground components may provide enough heat in many climates to prevent the components within the insulated enclosure from freezing, but an auxiliary heater within the enclosure may be required for systems installed in particularly cold climates.

The various valves included in the present system, and shown in FIG. 3 and elsewhere described herein, all are power-operated so that the system automatically operates according to a predetermined process control, without requiring manual operator intervention. Solenoid-controlled valves may be utilized for that purpose. However, a higher degree of reliability has been obtained with valves of the kind using a rotary valve element driven by an electrical stepper motor. In any case, it should be understood that the selection of valves and other stock components disclosed herein is not critical to the present invention.

Figure 4:
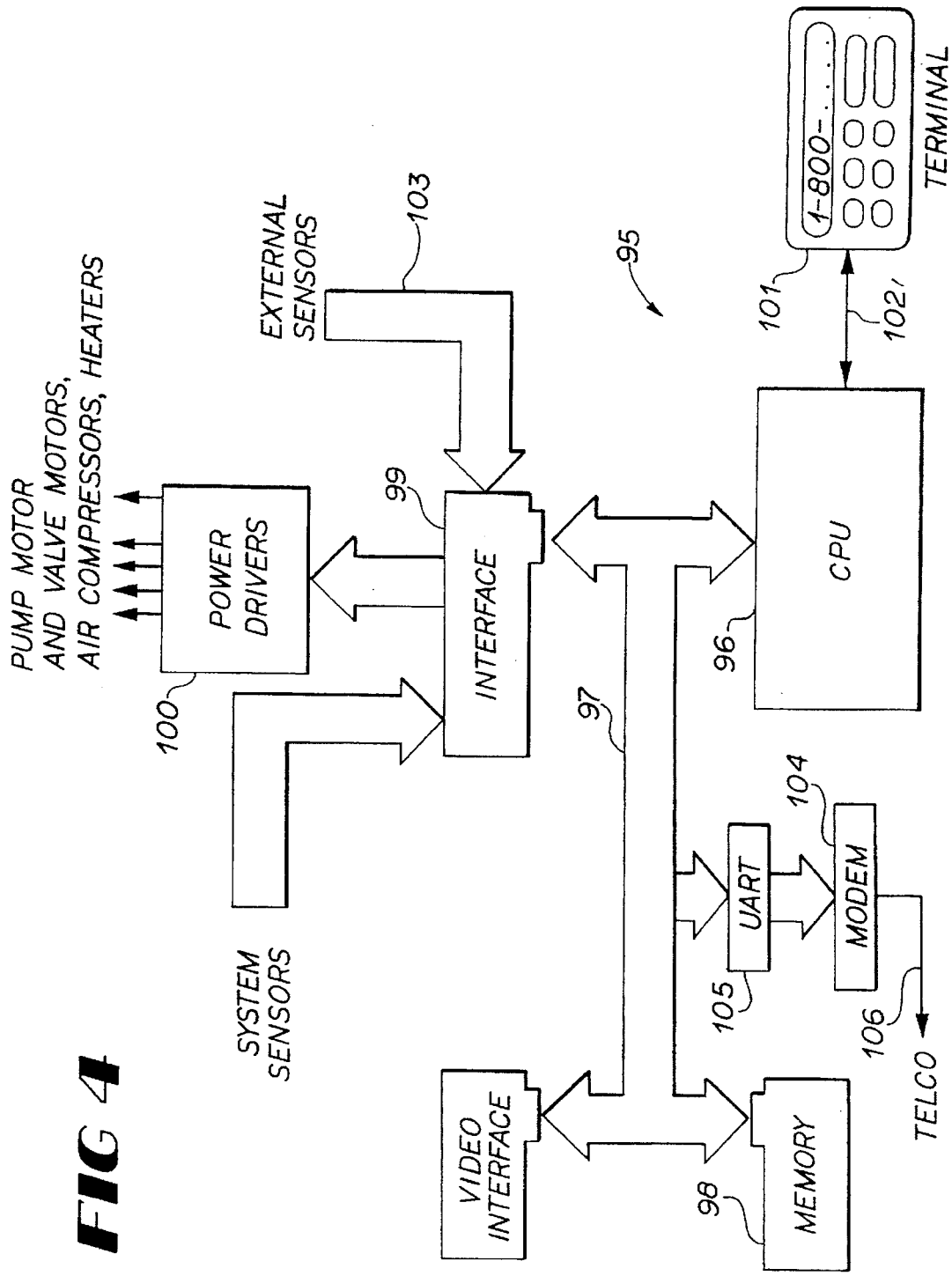
FIG. 4 is a block diagram showing a program controller for the apparatus of FIG. 3.

FIG. 4 shows a block diagram of the controller 95 for the apparatus and process disclosed herein. The controller 95 includes a central processor unit (CPU) 96 preferably contained on a single circuit board. That CPU is connected by a bus 97 to a memory card 98 containing the programmed instructions for operating the system according to the process steps as disclosed below. An interface 99 connects to the bus 97 and receives signals from the various sensors monitoring the operation of the wastewater treatment apparatus. Those sensors include the flow sensor 29 (FIG. 3) monitoring the volume of liquid output from the pump 28, and the air pressure sensors 36 and 64 corresponding to the liquid levels in the intermediate and aerator-clarifier tanks. The interface 99 also converts those signals (if necessary) to digital form. The interface 99 may also receive signals from temperature sensors and other input sensors that may be included with embodiments of the present system as explained below in greater detail. These other sensors may monitor operating conditions such as the turbidity, pH, and temperature of liquid at one or more locations within the system, valve status, pressure differentials across filters or other components, disfunction of a pump or air compressor, or improper operating parameters of the system, as well as soil moisture adjacent an irrigation field or other moisture dispersal devices provided as part of the present system. As described below in greater detail, remote fault reporting capability and the option of monitoring and reporting home security and other parameters also is integrated on the single circuit board. For that optimal purpose, the interface 99 of the controller 95 can receive signals from sensors external to the components of the wastewater treatment system, as indicated by the signal input bus 103 in FIG. 4.

The interface 99 also connects with the pump 28 and the valves through the power drivers 100. Those power drivers supply the relatively high current required to energize the coils of the motor starter for the pump 28, the stepper motors or other actuators for the valves, and other operating elements associated with the present system and functioning under control of the programmed CPU. The CPU 96 in a preferred embodiment of the present invention is designed using an Intel 386EX processor running at 25 MHz system clock, but it will be understood that the choice of a particular processor or clock speed is not a critical aspect of the present invention. The processor card, as well as separate cards containing the memory 98 and the interface 99, plug into a multislot backplane. A terminal 101 is connected to the CPU 96 by a serial link 102. All controller components except for the terminal 101 preferably are mounted on the modular platform containing the pump, the valves, and other above-ground components of the present system. The terminal 101, however, preferably is located inside the residence or other location serviced by the present sewage treatment system, so that any malfunction or component failure detected by the CPU can be audibly and visually displayed on the terminal.

Those skilled in the art will realize that the controller 95 also can be connected through a conventional dial-up telephone line to automatically place a service call, in response to an indicated malfunction or component failure. An optional interface port 103 can be connected to the bus 97 for attaching a video monitor or external computer, if desired, modem 104 can be connected to the bus 97 through the UART 105, allowing the controller to initiate or receive calls with a central computer using a dial-up telephone line 106. Details of automated data transmission and reception embodiments of the present system are set forth below.

The preferred operating process is now discussed for the sewage treatment apparatus as described thus far. This operating process is graphically depicted in the flow chart of FIGS. 11A and 11B. Unless the context of the following discussion indicates otherwise, the following discussion assumes a cold start for a newly-installed sewage treatment miniplant. That is, the primary settling tank 16 is filled with water, the intermediate tank 24 is half filled with water, the aerator-clarifier tank 56 is almost empty (containing sufficient water to maintain prime to the pump), and the primary settling tank has just begun receiving influent in the form of raw sewage. That inflow to the primary settling tank 16 continues until the liquid level within that tank reaches the outlet 19 (FIG. 3) and wastewater begins overflowing by gravity into the intermediate tank 24. As previously mentioned, the raw sewage entering the settling tank 16 undergoes some degree of anaerobic and biological treatment, and the readily-settleable solids will settle out and remain in the settling tank. Scum and other floatable material is prevented from flowing into the intermediate tank 24 by weirs installed in the settling tank and illustrated in FIG. 3 by the baffle assembly 18.

Figure 11A:
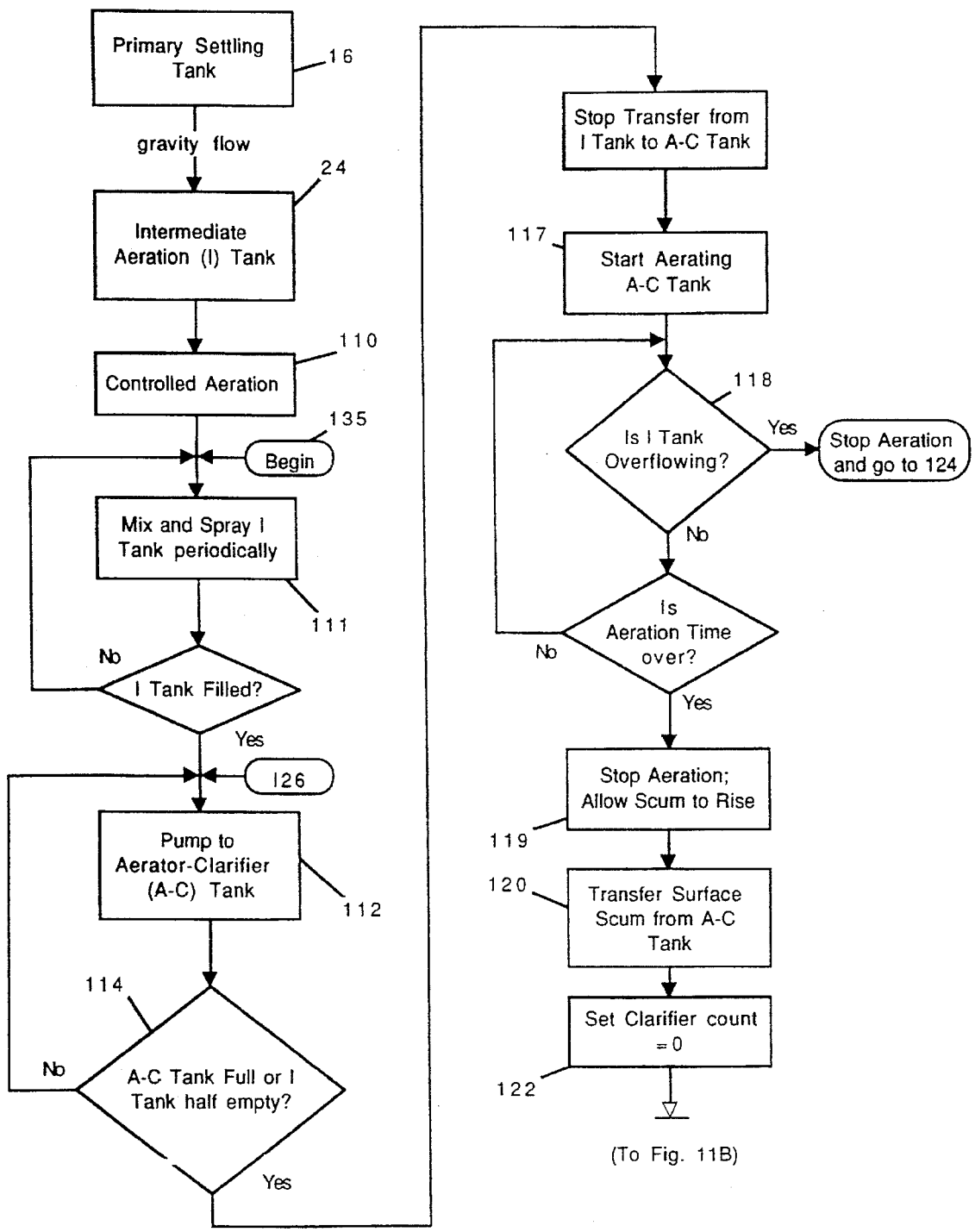
FIGS. 11A and 11B are a flow chart showing the operation of the preferred embodiment.

Wastewater received in the intermediate tank 24 is aerated as indicated by step 110 in FIG. 11A. This aeration takes place by operation of the air compressor 32 supplying air to the air diffusers 30 located at the bottom of the intermediate tank. The oxygen content of this air augments the growth of microorganisms in the wastewater within the intermediate tank and thus stimulates aerobic treatment of organic materials in that wastewater. The aeration in the intermediate tank 24 also accomplishes some mixing of the wastewater. Full mixing and churning of the wastewater in the intermediate tank is achieved by periodically operating the pump 28 with the valves oIV and iIV open, so that wastewater is withdrawn through the inlet 51 of the suction line 49 within the intermediate tank and is returned to that tank through the internal mixer 45. The pumped flow of wastewater through that internal mixer entrains other wastewater in the intermediate tank, producing a jet mixing action that is directed toward the bottom of the intermediate tank by appropriate positioning of the internal mixer. This mixing and churning within the intermediate tank 24 keeps the biomass within that tank thoroughly mixed with the incoming wastewater arriving from the settling tank 16, and also promotes the aerobic activity within the intermediate tank. As previously mentioned, the temperature within the intermediate tank preferably is maintained at a level which optimizes the growth of bacteria, by use of the immersion heater 34 within the intermediate tank.

In addition to the mixing step discussed in the preceding paragraph and appearing at 111 in FIG. 11A, the interior wall of the intermediate tank 24 is periodically sprayed to wash that wall and keep the wall moist so that solids do not dry and remain encrusted on the wall. This washing takes place with the valves oIV and SpIV open while the pump 28 is operated. Wastewater thus is withdrawn from the intermediate tank and returned to that tank through the sprayer 38, which directs an intense liquid spray onto the wall of the intermediate tank.

Mixing and spraying of the intermediate tank can take place at regular periodic intervals, so long as the pump 28 is not being used for another purpose as described below. In a preferred embodiment of the present invention, mixing within the intermediate tank takes place every 27 minutes and lasts for approximately three minutes. Spraying of the intermediate tank takes place every 30 minutes and lasts for approximately one minute. However, although those times and durations are considered to be effective, they are not critical to the operation of the present invention. Furthermore, those times and durations, and other operating parameters of the system, are changeable by changing the operating program for the CPU 96.

The level of wastewater in the intermediate tank 24 is continuously monitored. As previously mentioned, this level monitoring occurs as a function of the back pressure in the line 31 supplying air to the air diffusers 30 at the bottom of the intermediate tank, as measured by the air pressure sensor 36 in the air line leading to the air diffusers. That air pressure sensor 30 can be a single sensor that provides a continuous output signal responsive to measured back pressure in the line 31, or alternatively can be a pair of pressure sensors respectively set to produce appropriate signals when the back pressure exceeds a certain maximum amount (corresponding to a predetermined high liquid level in the intermediate tank) and when that pressure falls below a certain minimum amount (corresponding to a predetermined low level of liquid in that tank). In either case, electrical signals from the air pressure sensor 36 are connected to the interface 99 (FIG. 4) of the controller and are interpreted by the control program of the CPU 96 as indicating the corresponding liquid-level states in the intermediate tank 24.

The intermediate tank 24 in the disclosed embodiment has a 700 gallon capacity. The process is controlled so that the wastewater level within the intermediate tank fluctuates between 270 and 540 gallons, with the extra 160 gallon capacity providing a reserve to accommodate occasional peak flow situations. Thus, when the sensed level of wastewater in the intermediate tank reaches an upper level corresponding to 540 gallons, a 270-gallon batch of that wastewater is transferred from the intermediate tank to substantially fill the aerator-clarifier tank 56 as shown at 112 in FIG. 11A. The programmed controller accomplishes this transfer by operating the pump 28 while the valves oIV and iAV are opened. Wastewater thus is removed from adjacent the bottom of the intermediate tank through the suction line 49 and enters the aerator-clarifier tank 56 through the internal mixer 58, which directs a jet of the wastewater liquid toward the bottom of the aerator-clarifier tank. The transfer of wastewater of the intermediate tank to the aerator-clarifier tank continues until 270 gallons (one-half the 540 gallons in the intermediate tank, and also the working capacity of the aerator-clarifier tank in the disclosed embodiment) is transferred from the intermediate tank, or until the sensed liquid level in the aerator-clarifier tank shows that tank is full, as indicated by the decision step 114 in FIG. 11A.

Once a full batch of wastewater is transferred to the aerator-clarifier tank, no more wastewater will be added to that tank until treatment of that batch is completed. Furthermore, no liquid is withdrawn from the aerator-clarifier tank during batch treatment, except at certain times and for the purposes of the present process. Further aerobic treatment of the batch wastewater takes place under controlled conditions, without disturbance by or dilution with incoming wastewater from the intermediate tank 24. Aeration, mixing, and spraying continue within the intermediate tank while the batch treatment takes place in the aerator-clarifier tank 56.

Treatment of the wastewater batch in the aerator-clarifier tank begins by aerating that wastewater, accomplished by operating the air compressor 62 to infuse air into the tank through the air diffusers 61 located at the bottom of the tank. This step of aeration, indicated at 117 in FIG. 11A, continues for six hours in the preferred embodiment. During that aeration and at other times, the liquid level in the intermediate tank 24 is monitored as at step 118 to avoid an overflow condition. If the intermediate tank is approaching overflow as indicated by the decision step 118, aeration of the aerator-clarifier tank 56 is stopped and the process jumps forward to pump liquid from the aerator-clarifier tank to the drain field, as indicated by step 124 and as explained in greater detail below.

After the wastewater batch newly transferred to the aerator-clarifier tank has been aerated for the prescribed time, aeration is stopped by turning off the air compressor 62 and the wastewater in that tank is allowed to stand without external disturbance. This step, indicated at 119 in FIG. 11A and lasting five minutes in the preferred embodiment, allows scum to rise to the surface of wastewater in the aerator-clarifier tank. The floating scum then is removed from the aerator-clarifier tank by operating the pump 28 while the valves oFltV, and either WV or SV are opened. The inlet side 50 of the pump 28 thus is connected to the flexible hose 74 leading to the skimmer 72 within the aerator-clarifier tank, so that a surface layer of the liquid is withdrawn from that tank and transferred either to the drain field via valve WV or to the sludge collector 90 via valve SV. This scum transfer step 120 takes place as the pump 28 operates for 15 seconds to withdraw approximately six gallons of surface liquid from the aerator-clarifier tank.

After transfer of scum from the batch of wastewater in the aerator-clarifier tank is completed, that batch of wastewater enters the clarifier phase of the sewage treatment process. This clarifier phase takes place in three discrete stages, with clear liquid supernatant being pumped from the top of the aerator-clarifier tank to the drain field and sludge being withdrawn from the bottom of that tank at each stage of the clarification phase. The clarifier phase begins by setting a clarifier count equal to 0 in the CPU 96 of the controller, indicated at step 122 in FIG. 11A. The first step of each clarification stage is indicated at 123 in FIG. 11B, wherein the aerated wastewater in the aerator-clarifier tank is allowed to stand still for 30 minutes. Assuming the food/microorganism ratio within the aerator-clarifier tank is in the endogenous phase previously discussed with regard to FIG. 2, the microorganisms in the wastewater batch should flocculate rapidly and settle by gravity to form a layer of sludge at the bottom of that tank. This settling activity during clarification leaves a layer of clear supernatant liquid at the top of the wastewater batch in that tank. A quantity of sludge is wasted or returned to the intermediate tank from the aerator-clarifier tank every 15 minutes, during each stage of clarification, as shown at the steps 121 and 128a, and also at the end of the clarification stage as shown at the step 128b and the step 131 and as described below. The interim transfer of sludge helps prevent the denitrification and bulking of the sludge.

As part of each clarification step, supernatant liquid is withdrawn from the aerator-clarifier tank by operating the pump 28 while the valves oFltV and WV are opened. The clear supernatant liquid thus is pumped from the surface of the aerator-clarifier tank to the drain field, where that liquid undergoes subterranean dispersion in the usual manner. This pumping step, indicated in FIG. 11B at 124, occurs for two minutes and removes approximately 45 gallons of supernatant liquid through the skimmer 72 within the aerator-clarifier tank. Before pumping supernatant liquid to the drain field, the pump is rinsed by briefly pumping supernatant liquid back to the intermediate tank with valves oFlt and SpIV open. This rinsing action is shown at step 127 in FIG. 11B and clears the pump of the aerobic sludge most recently pumped while wasting or returning the sludge to the intermediate tank.

After transferring supernatant liquid from the aerator-clarifier tank to the drain field, the operating process checks the liquid level in the intermediate tank 24 as shown at the decision step 125, to see whether the intermediate tank is at risk of overflowing. That untimely condition could occur, for example, by an unanticipated increase in the volume of wastewater arriving at the settling tank 16. If an overflow of the intermediate tank is indicated by the liquid level in that tank, the process at that time reverts to step 126, FIG. 11A, causing the pump 28 to transfer wastewater from the intermediate tank to the aerator-clarifier tank until one of the alternative conditions shown in decision block 114 is fulfilled. That unscheduled transfer of wastewater from the intermediate tank to the batch of liquid already undergoing clarification in the aerator-clarifier tank may disturb the growth phase of the biomass in the remaining wastewater batch already present in the latter tank, but it is preferable to the consequences of overflowing the intermediate tank and the settling tank.

If no overflow condition is indicated at the decision step 125, the first stage of clarification continues by removing a quantity of the sludge that previously settled to the bottom of the aerator-clarifier tank. If a sludge wasting condition is in effect as shown by the decision step 128b, the pump 28 is operated while the valve oAV and SV are opened. The pump 28 thus withdraws sludge from the bottom of the aerator-clarifier tank and pumps that sludge through the opened valve SV to the sludge collector 90. However, if sludge wasting is not on, the pump 28 is operated while the valves oAV and iTV are opened, so that the sludge is transferred from the bottom of the aerator-clarifier tank back to the intermediate tank 24 through the internal mixer 45 in that latter tank. This sludge-transfer step is shown at 131 in FIG. 11B. The pump 28 is operated for one minute to transfer approximately 23 gallons of sludge from the aerator-clarifier tank, in the preferred embodiment, but that pumping time (and the amount of sludge transferred) is a programmable parameter as mentioned above. This transfer of sludge from the aerator-clarifier tank to the intermediate tank helps build the biomass in the intermediate tank. The pumpdown of sludge from the bottom of the aerator-clarifier tank may create a downward current in the liquid remaining in that tank. Once the predetermined amount of sludge has been removed from the aerator-clarifier tank, the interior wall of the aerator-clarifier tank is rinsed by spraying with supernatant liquid to remove accumulated sludge and return that sludge to the remaining wastewater in the tank as shown at step 135. This spraying takes place by operating the pump 28 while the valves oFltV and SpAV are opened. The pump 28 thus draws supernatant liquid from the surface of the aerator-clarifier tank and returns the liquid to the spray nozzle 57 located at the top of that tank. After the wall of the aerator-clarifier tank is cleaned by spraying, the first stage of the clarification phase is completed and the clarifier count maintained by the CPU 96 is incremented by one as shown at the step 129.

Returning to the sludge-wasting decision steps 128a and 128b, that decision can be determined in several ways. One way is by monitoring the optical turbidity of the wastewater being periodically recirculated in the intermediate tank. When that turbidity rises to the range of 1500–2000 mg/l, it is appropriate to waste a quantity of sludge to the sludge collector 90 as in the steps 128a and 128b instead of returning more sludge to the intermediate tank. With that arrangement, sludge wasting is automatically initiated and terminated in response to a measured range of optical turbidity. In the absence of a suitable turbidity sensor, an acceptable approximation of the sludge-wasting decision is obtained by programming the processor 96 to waste no sludge for the first four to six months of operation of the present sewage treatment system. The processor is programmed to automatically waste six to eight gallons of sludge each day after that initial period of operation.

After the clarifier count is incremented as shown at step 129, the system next determines whether the three-stage clarifier phase is completed, indicated in the decision step 132. If the incremented clarifier count remains less than three, at least one more stage of the clarifier phase remains and the next clarifier stage commences by returning to the beginning of clarification indicated at 123. When the third stage of clarification, dispersion of supernatant, and sludge return is completed, the aerator-clarifier tank should be almost empty. However, some liquid should remain in that tank to maintain prime in the pump.

Figure 11B:
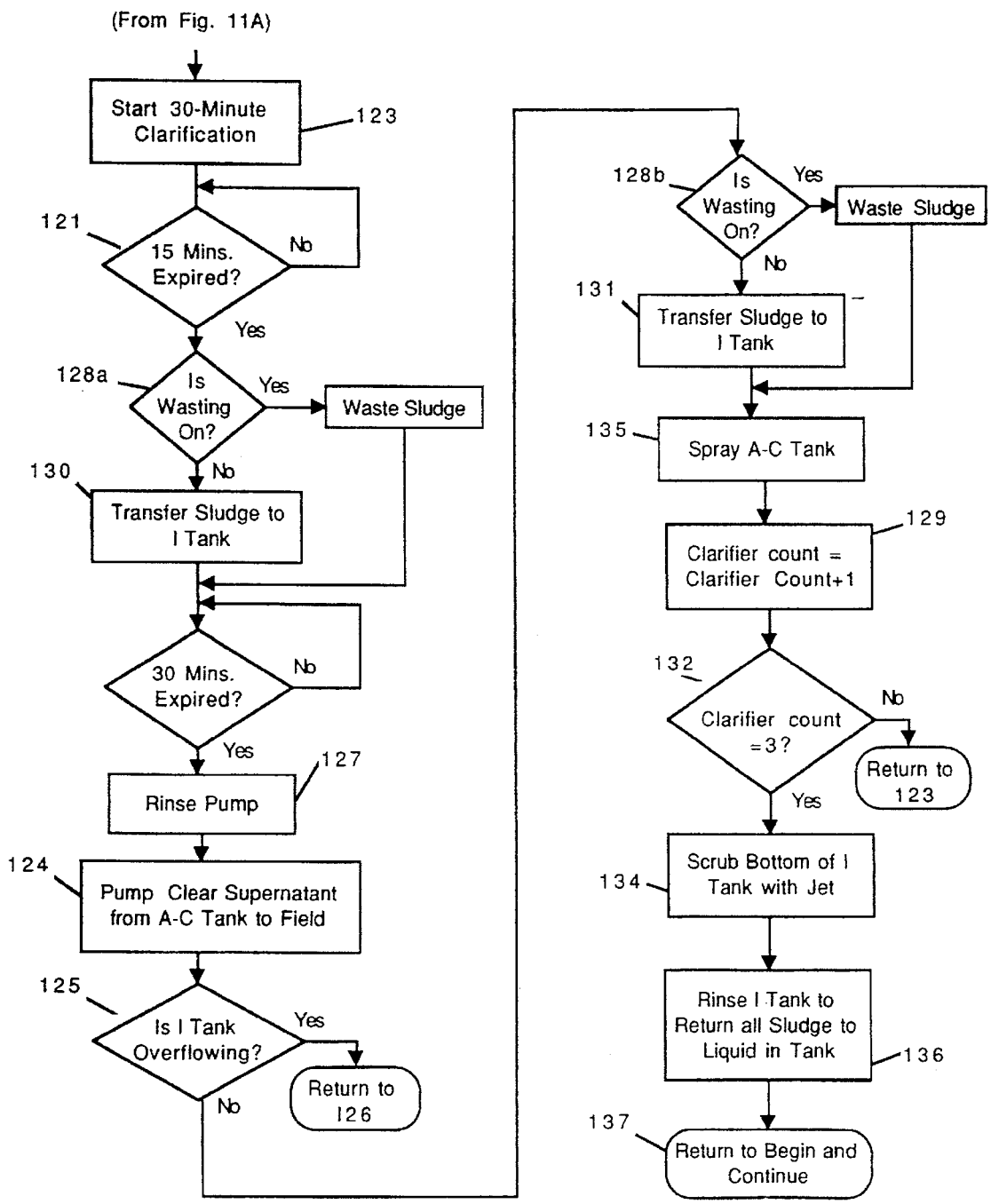

The bottom of the intermediate tank is scrubbed using the jet from the internal mixer 45 within that tank as shown at step 134, FIG. 11B. The walls of the intermediate tank are again rinsed by spraying liquid through the internal sprayer 38 at the top of that tank, as shown at step 136, to return all sludge from the tank wall to the liquid in that tank. Once those steps are completed, the programmed operation returns to the beginning as indicated at step 137 and the controller now waits for the intermediate tank to fill up to the predetermined high level that triggers transfer of another batch of wastewater from that tank to the aerator-clarifier tank.

It should be understood that the tank sizes and other disclosed parameters of the preferred embodiment are engineered for installation at the site of a single-family residence and intended for treating the wastewater expected from such residences. Sewage treatment miniplants according to the present invention and intended for different installations expected to produce greater or lesser volumes of wastewater can be engineered to accommodate those different requirements.

It may be desirable to include a "vacation mode" of operation in the operating program for the present system. A vacation mode of operation will reduce the wastewater throughput of the system and downsize the volume of biomass in the intermediate tank without depleting the biomass from that tank, so as to avoid shocking the system when normal wastewater flows resume after vacation. The vacation mode can be manually selected at the terminal 101 (FIG. 4), or preferably is inferred by the operating program as a function of a predetermined reduction in the rate at which influent enters the intermediate tank over a time period sufficient to exclude daily rhythms of wastewater production. The end of a vacation mode likewise can be inferred from a sudden increase in the flow rate of influent to the intermediate tank.

The aerator-clarifier tank 56 does not completely remove bacteria from the supernatant liquid effluent pumped from that tank and dispersed into the ground by the drain field 92. If it is desired to use that liquid in a subterranean irrigation system or in other applications where humans may contact the liquid or the vegetation irrigated by that liquid, it may be necessary to treat the liquid to achieve disinfection of pathogens. This treatment can take place, for example, by chlorination, ozonation, or ultraviolet radiation at an effective dosage to achieve disinfection of pathogens. The most cost-effective approach to such disinfection at the present time, according to the present invention, is to treat the supernatant effluent from the aerator-clarifier tank 56 with a chlorine compound for a contact period sufficient to kill the bacteria in the effluent. However, the use of ozonation equipment may be an appropriate alternative for wastewater treatment systems installed at locations where groundwater levels are high or where residuals of chlorine compounds cannot be tolerated.

Figure 12:
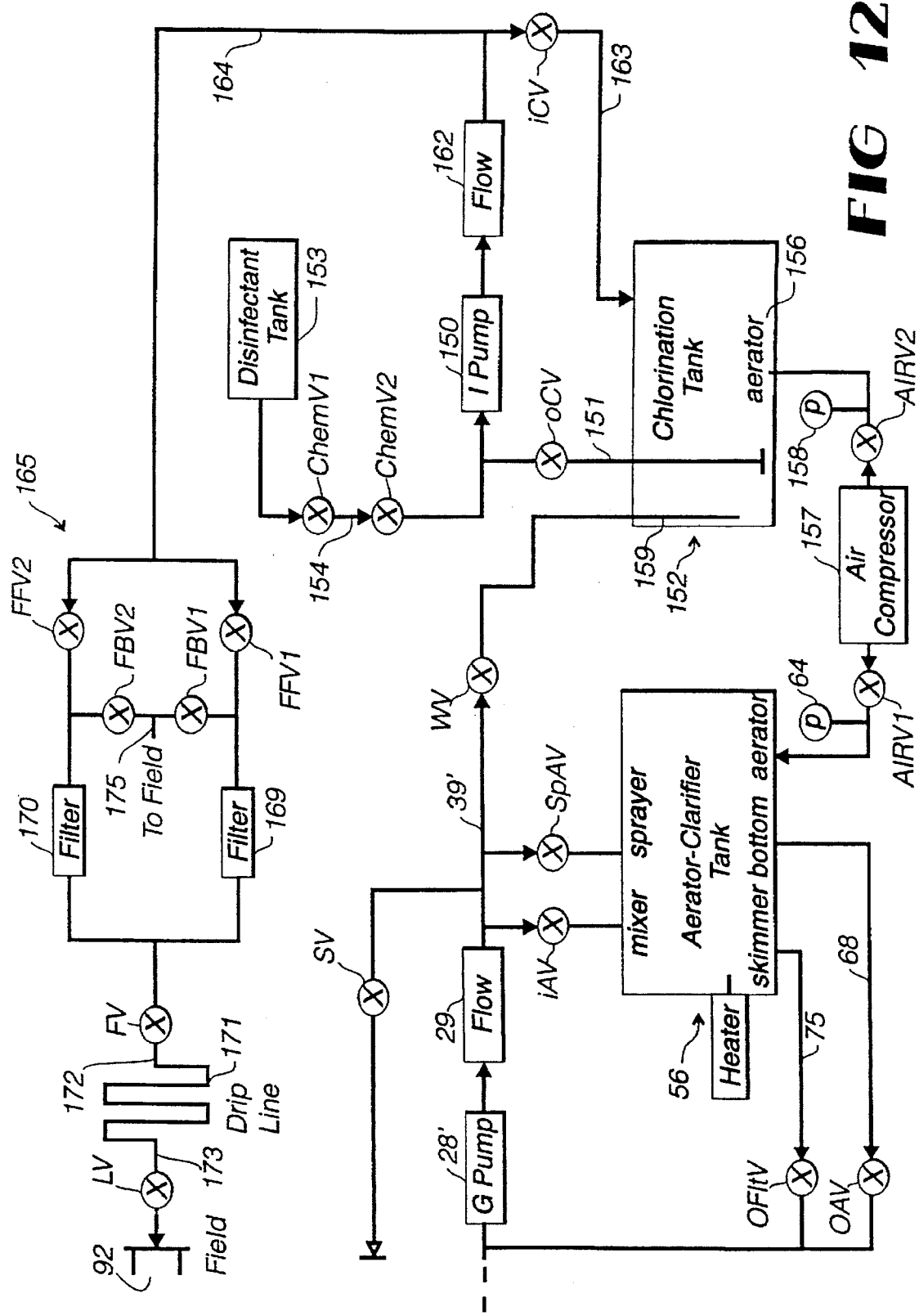
FIG. 12 is a partial schematic diagram of sewage treatment apparatus according to a modification of the preferred embodiment.

Disinfection of the liquid effluent from the aerator-clarifier tank 56 is accomplished according to the modified apparatus shown in FIG. 12. The aerator-clarifier tank 56 shown in FIG. 12 is identical to the corresponding tank in FIG. 3, and it should be understood that the wastewater treatment apparatus upstream of the aerator-clarifier tank in FIG. 12 is identical to that previously shown and described with respect to FIG. 3. However, the pump 28 of FIG. 3 is redesignated in FIG. 12 as the G pump 28', to distinguish that pump from a second pump used in the modified embodiment of FIG. 12. The outlet line 39' from the G pump 28' connects to the valve WV, but that valve does not lead to the drain field as in FIG. 3. The outlet line 39' does extend to the valves iAV, SpIV, and SV as previously mentioned with regard to FIG. 3. Moreover, the line 75 from the skimmer within the aerator-clarifier tank 56 is connected through the valve oFltV to the inlet side of the G pump 28', similar to the arrangement shown in FIG. 3. When the G pump 28' is operated with the inlet valve oFltV and the outlet valve WV opened, supernatant liquid is pumped from the aerator-clarifier tank 56 to the chlorination tank 152. That pumped liquid enters the chlorination tank 152 through the inlet pipe 159 entering the top of the chlorination tank and extending approximately half-way to the bottom of that tank.

The chlorination tank 152 can have a liquid capacity less than that of the aerator-clarifier tank, which has a 400 gallon capacity in the present embodiment, because the supernatant is transferred from the aerator-clarifier tank to the chlorination in increments during the multistage clarification process described above. The discharge line 151 enters at or close to the top of the chlorination tank and has its inlet end located near the bottom of that tank. Also located at the bottom of the chlorination tank 152 is an aerator 156, which may be similar in construction and operation to the air diffusers 30 and 61 described above. The aerator 156 selectively receives compressed air from the air compressor 157 through the valve AirV2. The same air compressor 157 may also supply compressed air through the valve AirV1 to the air diffuser located in the aerator-clarifier tank 56. An air pressure sensor 158 is connected to measure the air back-pressure within the line leading from the valve AirV2 to the aerator 156, thereby providing a signal to the controller 95 corresponding to the depth of liquid in the chlorination tank 152.

The inlet side of the I pump 150 is selectively connectable to the discharge line 151 through the valve oCV. The inlet of the I pump also is selectively connectable through the valve ChemV2 to receive a measured dose of a chlorine compound previously admitted to the vented tube 154 through the valve ChemV1, which is located in series with the vented tube and a disinfectant tank 154 containing the chlorine compound as described below. The outlet side of the I pump 150 is connected through a flow sensor 162 to one side of the valve iCV, in the second inlet line 163 leading to a liquid inlet at the top of the chlorination tank 152. The output from the I pump 150 also goes to the line 164 leading to the irrigation control valves and filters indicated generally at 165, which control the disposition of the effluent pumped from the chlorination tank 152. If deemed necessary for proper mixing within the chlorination tank, an internal mixer can be connected to the inlet line 163 for recirculating the chlorinated supernatant by operating the pump 150 with the valves oCV and iCV opened.

The modification shown in FIG. 12 can direct the disinfected effluent either to an appropriate drain field 92 as discussed above, or to a subsurface drip line field 171 for irrigating vegetation such as lawns and gardens, shrubbery, flower beds, or the like. Various kinds of subsurface irrigation lines are known to those skilled in the art. Subsurface irrigation using a drip or trickle of liquid is considered the most efficient method of distribution, because there is minimal water loss due to evaporation or surface runoff. Drip or trickle irrigation includes a distribution piping network with delivery of the water from the pipe made by small emitters spaced along the piping. The emitters in a typical drip line have relatively small orifices for discharging liquid into the soil, so that the emitter discharge rate for a given emitter is proportional to the drip-line liquid pressure at the particular emitter. Because of the relatively small orifice size, the water supply for a drip irrigation system must be kept clean and free from grit or other solids that could clog the emitters.

The irrigation control 165 shown in FIG. 12 includes a pair of valves FFV1 and FFV2 connected in parallel to receive liquid pumped through the line 164. The outputs from those two valves go to the separate filters 169 and 170, which filter the water to remove grit or other particulate matter that otherwise could clog the emitters in the drip line. Each filter 169 and 170 can comprise disk filters using a 120 or 150 mesh disk designed for high particle retention. The filters should be of a kind cleanable by backwashing as described below.

The outputs of the filters 169 and 170 are connected in parallel to one side of a valve FV which leads to the subsurface drip line field shown schematically at 171. It should be understood from the preceding discussion that the drip line is buried in the soil at a suitable depth and includes a number of discrete liquid emitters, or otherwise is perforate so as to deliver a flow of liquid into the soil adjacent and covering the drip line when liquid is pumped into the drip line. The subsurface depth of the drip line in the field 171, as well as the spacing of discrete emitters along that line, will vary with conditions such as the kind of soil, the kind of vegetation growing at the soil surface, and the possible need to bury the drip line below the frost line in northern climes. Moreover, the drip line 71 optionally can be divided into multiple irrigation zones with valves controlling the liquid flow into each zone, and moisture probes within each zone can supply information to the controller 95 to utilize the disinfected wastewater most efficiently.

The outlet end 173 of the drip line for the field 171 is connected to the valve LV leading to the drain field 92. This valve LV normally remains closed during drip irrigation, to maintain back pressure within the drip line.

Returning to the irrigation control 165, a pair of valves FBV1 and FBV2 are connected to the output sides of the respective valves FFV1 and FFV2 and to the input sides of the respective filters 169 and 170. The output sides of the valves FBV1 and FBV2 are connected to a line 175 which leads to the drain field 92.

Figure 13:
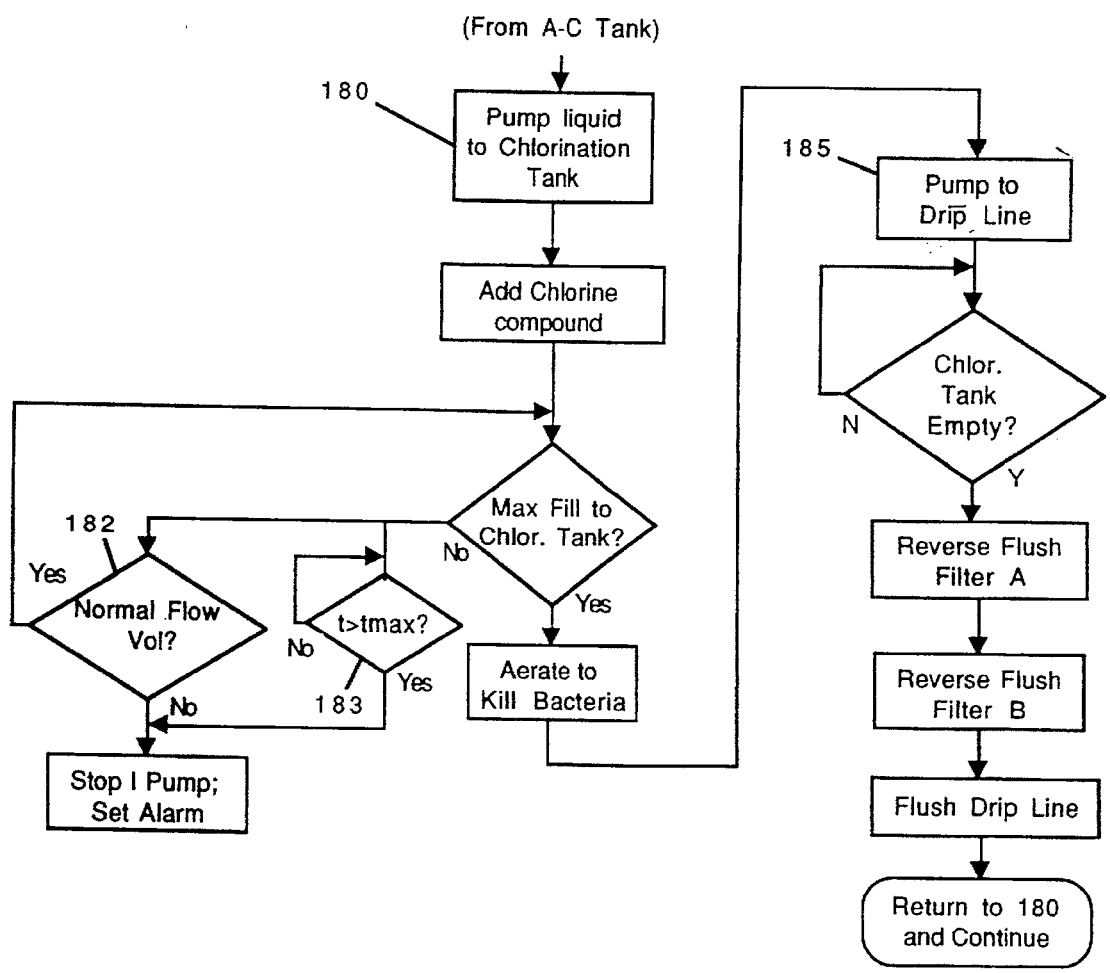
FIG. 13 is a flow chart showing the operation of the modified embodiment shown in FIG. 12.

The operation of the modified embodiment shown in FIG. 12 is now considered with reference to the flow chart of FIG. 13. It will be recalled that clear supernatant liquid is periodically withdrawn from the aerator-clarifier tank 56 and pumped to the drain field during the several stages of clarification described above with regard to the apparatus shown in FIG. 3. With the modification shown in FIG. 12, the supernatant liquid from the aerator-clarifier tank 56 instead is transferred to the chlorination tank 152. This transfer, shown by the step 180 in FIG. 13, is accomplished by operating the G pump 28' while the valves oFltV connecting the skimmer line 159 to the inlet side of the G pump, and WV connecting the output side of that pump to the inlet line 159 leading to the chlorination tank, are opened. The G pump 28' thus withdraws a predetermined amount of supernatant liquid through the skimmer within the aerator-clarifier tank 56 and transfers that liquid to the chlorination tank 152.

While the G pump 28' is transferring supernatant liquid to the chlorination tank 152, or after that transfer, the valve ChemV2 is opened to dispense a predetermined amount of disinfectant for mixing with that liquid in the chlorination tank. In the preferred embodiment, this disinfectant solution is sodium hypochlorite stored in liquid form in the disinfectant tank 153. This disinfectant solution, containing concentrations between 5% to 15% of available chlorine, is transferred to the chlorination tank 152. The two series-connected valves ChemV1 and ChemV2 are opened in a mutually-exclusive fashion; the valve ChemV1 is initially opened to fill the vented tube 154 between ChemV1 and ChemV2 with a dose of the disinfectant in an amount determined by the volume of the tube. Then, ChemV2 is opened (with ChemV1 now closed) while the I pump 150 is operated with the valves oCV and iCV open, but with valves FFV1 and FFV2 closed. The I pump thus recirculates the liquid transferred from the aerator-clarifier tank 56 while mixing the dose of chlorine compound with that liquid.

The fill level in the chlorination tank 152 is monitored by the controller 95 (FIG. 4) based on input signals from the air pressure sensor 158. If the predetermined maximum fill level is not reached and signals from the flow sensor 62 indicate an abnormally low rate of flow, an alarm condition is set and the G pump 28' is shut down as shown at 182 in FIG. 13. Furthermore, this transfer of liquid (and all other pumped effluent transfers in the present system) also is timed to monitor proper functioning of the pump and valves associated with the liquid transfer. For example, if an air leak were to develop in a pipe on the suction side of a pump, that pump may lose prime. If the pump continues to run dry for a long time, it may be damaged. Therefore, the controller 95 shuts down the pump and generates an alarm message if the pump continues to operate longer than a predetermined time $t_{max}$ allowed for a particular liquid transfer. This timed mounting and shutdown of the I pump 150 during liquid transfer to the chlorination tank 152 is shown as the step 183 in FIG. 13 and should be understood as also being present in the other pumped transfers of liquid disclosed herein. After a predetermined amount of supernatant liquid is transferred to the chlorination tank 152, compressed air is supplied to the aerator 156 within that tank to mix the liquid with the chlorine compound dispensed to that liquid. This aeration mixing continues for 30 minutes in the preferred embodiment, to provide sufficient contact time for killing the bacteria remaining in the supernatant liquid pumped from the aerator-clarifier tank. That liquid now is ready for dispersal to the drip line field 171 or the drain field 92.

When transferring liquid from the chlorination tank 152, it may be desirable first to recirculate the liquid in that tank for a short time to churn the liquid and assure its complete mixing. This is accomplished by operating the I pump 150 while the valves oCV leading to the discharge line 151 within the chlorination tank and iCV leading to the inlet line 163 to that tank are opened. As previously mentioned, adding an internal mixer to the outlet of the line 163 within the chlorination tank 152 will increase the amount of mixing with a given recirculation time. After a brief recirculation time, the valve iCV is closed and the irrigation control valves FFV1 and FFV2 are opened, leading to the filters 169 and 170 in the irrigation control 165. The disinfected liquid thus is pumped from the chlorination tank 152 to the filters 169 and 170. The valve FV at the inlet end 172 of the drip line field 171 also is opened at this time, so that the disinfected liquid passes through the filters 169 and 170 and enters the drip line. This step is indicated at 185 in FIG. 13 and can continue until the chlorination tank 152 is substantially empty, as indicated by the output of the air pressure sensor 158 or another liquid level sensing device associated with that tank. At that condition, the I pump 150 is stopped and the valves iCV, FFV1, FFV2, and FV are closed. The valve LV at the output end of the drip line 171 remains closed throughout the operation described above, so that the liquid being pumped into the drip line is maintained at a suitable back pressure for efficient operation of the emitters in the drip line.

The filters 169 and 170, as mentioned above, prevent grit and other particulate matter from entering the drip line. These filters must be cleaned from time to time to remove any accumulated particulate matter. To provide a low-maintenance system requiring minimum servicing, the filters 169 and 170 are designed to be cleaned by backwashing, that is, by pumping liquid through each filter in the reverse direction. Filter backwashing in the present system can take place either at predetermined intervals, for example, once every one or two days, or alternatively may take place when the measured pressure differential across the filter reaches a predetermined threshold. The latter alternative requires a differential pressure transducer (not shown) connected to the inlet and outlet sides of each filter, and appropriate circuitry to determine the measured pressure differential and compare that differential to a predetermined level.

When filter backwashing is required, the filter 169 is backwashed by operating the I pump 150 to withdraw liquid from the chlorination tank 152 through the opened valve oCV. At this time the valve FFV2 is opened, but the valve FFV1 remains closed. The valve FV on the inlet end 172 of the drip line also remains closed. However, the valve FBV1 leading from the inlet side of the filter 169 to the drain field line 175 is opened. The I pump 150 thus forces liquid through the opened valve FFV2 and through the filter 170 (in the forward direction) to enter the outlet end of the filter 169 and backwash that filter. This backwashing liquid flows through the opened valve FBV1 and through the line 175 leading to the drain field. The backwashing liquid, together with any grit or other particulate matter removed from the filter 169, thus flows to the drain field; the closed valve FV prevent that backwashed liquid from entering the drip line.

Once the filter 169 is backwashed, the positions of the valves FFV2 and FFV1 are reversed, so that the pumped liquid now flows in the forward direction through the filter 169 to enter the outlet end of the filter 170 and backwash that filter. The positions of the valves FBV1 and FBV2 also are reversed at this time, so that the backwash from the filter 170 enters the drain field through the line 175.

After both filters are backwashed, the valves FBV1 and FBV2 are closed and both valves FFV1 and FFV2 are opened. The I pump 150 then is operated while the valves FV and LV at the inlet and outlet sides of the drip line 171 are opened. This allows flushing the drip line, with the output from that line flowing into the drain field. This concludes the flushing operation, and the system returns to a status for transferring further supernatant liquid from the aerator-clarifier tank 56 to the chlorination tank 152.

Figure 14:
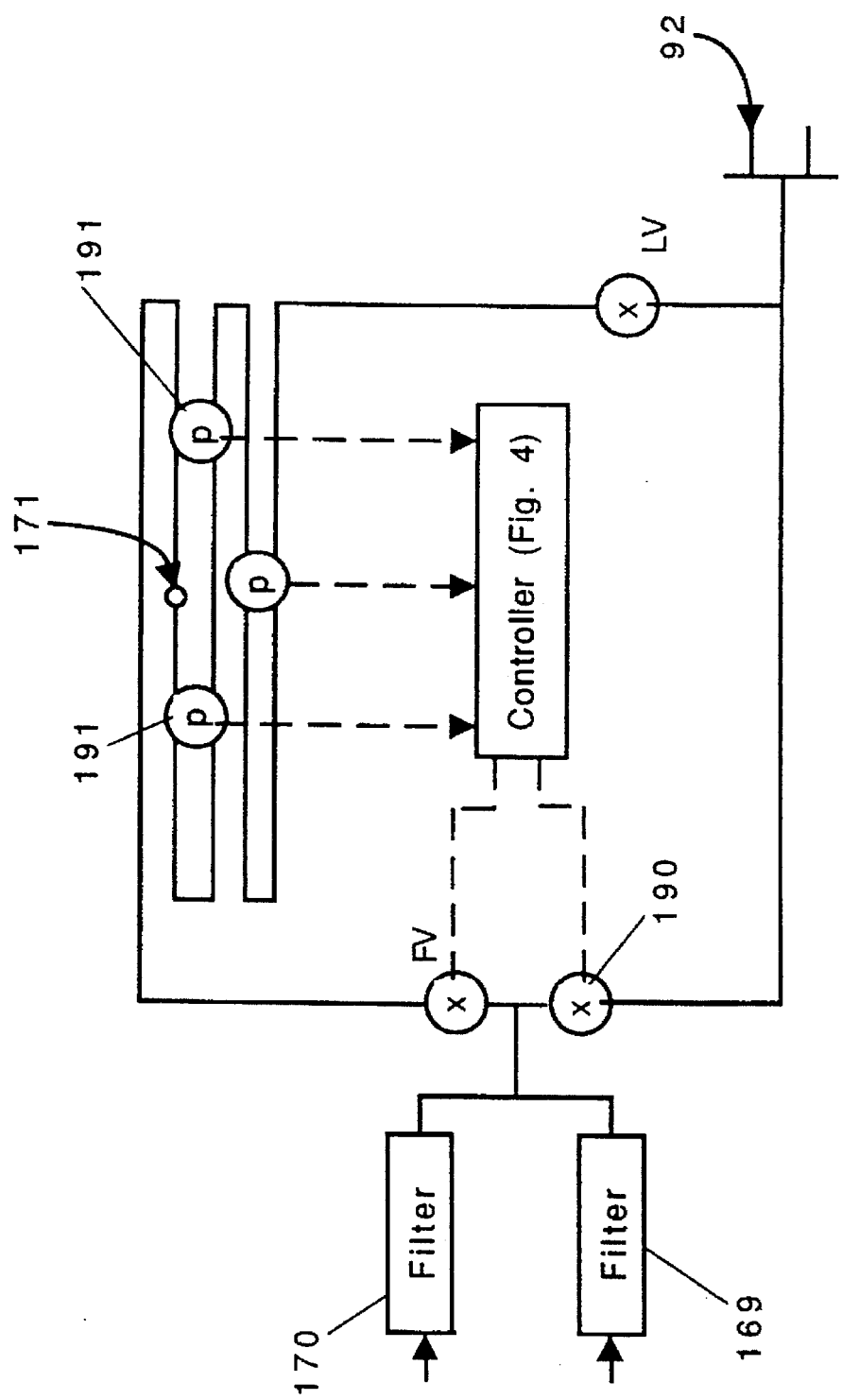
FIG. 14 is a schematic view of another modification, having both a drip irrigation field and a drain field for dispersing treated waste water from the embodiment of FIG. 12.

FIG. 14 shows a modification that permits dispersing wastewater effluent, such as the disinfected liquid from the chlorination tank 152, either to a drip irrigation field 171 or to a drain field 92, depending on soil conditions at the drip field. Although the extent and placement of the drip field 171 preferably should be designed to dispense the anticipated volume of effluent from the sewage treatment system in a particular installation, circumstances may arise where the soil at the drip field becomes too saturated for effective dispersion of more water from the drip line. The natural permeability of the soil within the field of the drip line and incidents of prolonged or heavy rainfall are two factors which can increase the saturation of the soil to a point where the soil temporarily is unable to absorb water from the drip line.

To overcome this problem according to the apparatus shown in FIG. 14, the output sides of the filters 169 and 170 are connected as before to a valve FV leading to the drip line field 171. However, the filter outputs also are connected through the valve 190 to the drain field 92, which thus is selectively connectable with the drip line. One or more moisture probes 191 are buried in the ground at locations disposed within the drip field 171, and those probes produce signals corresponding to the sensed ground moisture at those locations. These signals from the moisture probe(s) are supplied as inputs to the processor of the controller 95 shown in FIG. 4. Although three moisture probes 191 are shown in FIG. 14, it will be understood that a greater or lesser number of probes can be used depending on the extent and layout of the drip field 171. Suitable moisture probes 191 are known to those skilled in the art and are commercially available.

In the default mode of operation of the apparatus in FIG. 14, the soil surrounding the drip field 171 is presumed capable of accepting and dispersing the normal anticipated volume of effluent pumped into the drip field. The valve 190 in this default mode remains closed, and pumped effluent flows through the filters and the opened valve FV to enter the drip field 171. The valve LV at the remote end of the drip field remains closed at this time, as mentioned above, to maintain back pressure within the drip line.

Whenever the soil of the drip field 171 reaches a predetermined level of saturation indicating that the drip field temporarily cannot handle any more effluent pumped to that field, this soil condition is sensed by one or more of the moisture probes 191. The processor 96 is programmed to operate, in response to that sensed moisture condition, to close the valve FV and open the valve 190 whenever effluent is being pumped through the filters for dispersal. The pumped effluent thus is diverted from the drip field 171 to the drain field 92, giving the soil surrounding the drip field an opportunity to recover from its state of saturation without receiving more pumped effluent. When the probes 191 sense a predetermined lower level of moisture indicating that the soil surrounding the drip field 171 can accept more liquid, the controller restores the valves 190 and FV to their default modes so that the effluent again is pumped to the drip field 171. As previously mentioned, the valve LV at the outlet end of the drip line is opened only to flush the contents of the drip line into the drain field 92.

The drip field apparatus shown in FIG. 14 can be modified by providing several drip-line zones. In that modification, each such zone has a corresponding drip line, valves FV and LV at the inlet and outlet ends of the drip line, and one or more moisture probes 191 responsive to moisture in the ground adjacent the corresponding drip-line zone. The controller is programmed to dose each separate drip-line zone sequentially with effluent.

The present wastewater treatment system preferably incorporates self-diagnostic capability for detecting and reporting various system faults. Those faults can include events such as a dysfunctional pump, valve, or air compressor, as well as improper operating conditions such as wastewater throughput exceeding the maximum design flow limit for a particular system, or unauthorized tampering with the system. Selected parameters are monitored for supplying signal inputs to the interface 99, so that the controller 95 can monitor those parameters and compare them against preset fault or out-of-limit states. Examples of such parameters include the flow sensors 29 and 162 responsive to flow from the two pumps, and the air pressure sensors 36, 64, and 158 that provide signals indicating the liquid levels in the respective tanks. Sensors for determining the value or status of other parameters are known to those skilled in the art. For example, pump disfunction can be sensed by a tachometer responsive to the absence of pump rotation when the pump is turned on, or by a pressure sensor responsive to the output pressure produced by the pump. The various valves can include position sensors whose output signals indicate the actual position of each valve and thereby provide closed-loop feedback in response to the commanded operation of the valve.

If the present system encounters a fault condition, it can automatically report that condition to a central computer, in addition to locally reporting the condition at the terminal 101 (FIG. 4). This central reporting, in a basic embodiment of the invention, preferably takes place over the homeowner's telephone line to avoid the extra cost of maintaining a separate line dedicated for that purpose. If the telephone line is busy when a fault condition is detected, the system can defer reporting the fault condition for a programmable amount of delay. However, if the telephone line stays busy longer than that predetermined delay, the system turns on an audio alarm at the terminal 101 and displays a message requesting the homeowner to make the telephone line available. The system then automatically dials the telephone number of the central computer and transmits data, such as the identification number of the system and an identification number corresponding to a particular detected fault, to the central computer over the telephone line. This information at the central computer is used to print a service report useful for dispatching a service person to the location of the system reporting the fault. Such automated and unattended reporting of system faults is particularly useful for a home wastewater treatment system, where the early detection and prompt repair of a malfunctioning component can avoid the unpleasant and potentially-serious consequences of a system failure attributable to that component.

Data communication between the onsite systems and the central computer preferably is bidirectional. Each onsite system can periodically send information about various operating conditions, such as turbidity, to the central computer. The central computer can be programmed to compare that information with nominal values stored at the central computer, and to return signals reprogramming the operating conditions of individual onsite systems to run the sewage treatment process more efficiently. In this manner, the operation of each individual onsite system can be tailored to the wastewater treatment demands placed on that system.

The centralized reporting capabilities of the present wastewater treatment system can also be expanded to monitor the occurrence or unexpected cessation of other events at the site of the system. For example, the treatment system can function as a home security system. In this mode of operation, the interface 99 of the controller is connected to receive signals from various sensors external to the wastewater treatment system and located in the house or other premises. For example, external sensors can detect intrusion into or within the house, or can detect fire or smoke within the house. In response to such signals indicating an external event, the controller 95 is programmed to place a call over the telephone line to an appropriate agency or organization responsible to receive such data and take the necessary action.

Further yet, the controller of the present system can be connected to monitor utility usage such as water or electricity in the house, by supplying usage data in the form of signals from the utility meters modified for that purpose. Such utility metering apparatus is known to those skilled in the art and is embraced in the external sensors indicated in FIG. 17. The system can report the meter readings on a periodic basis to the public or private agency responsible for providing the utility service, thereby eliminating the need for meter readers to manually check the reading from every meter, and freeing both the utility companies and the homeowners from the uncertainties of bills based on estimates rather than on actual metered usage.

Figure 15A:
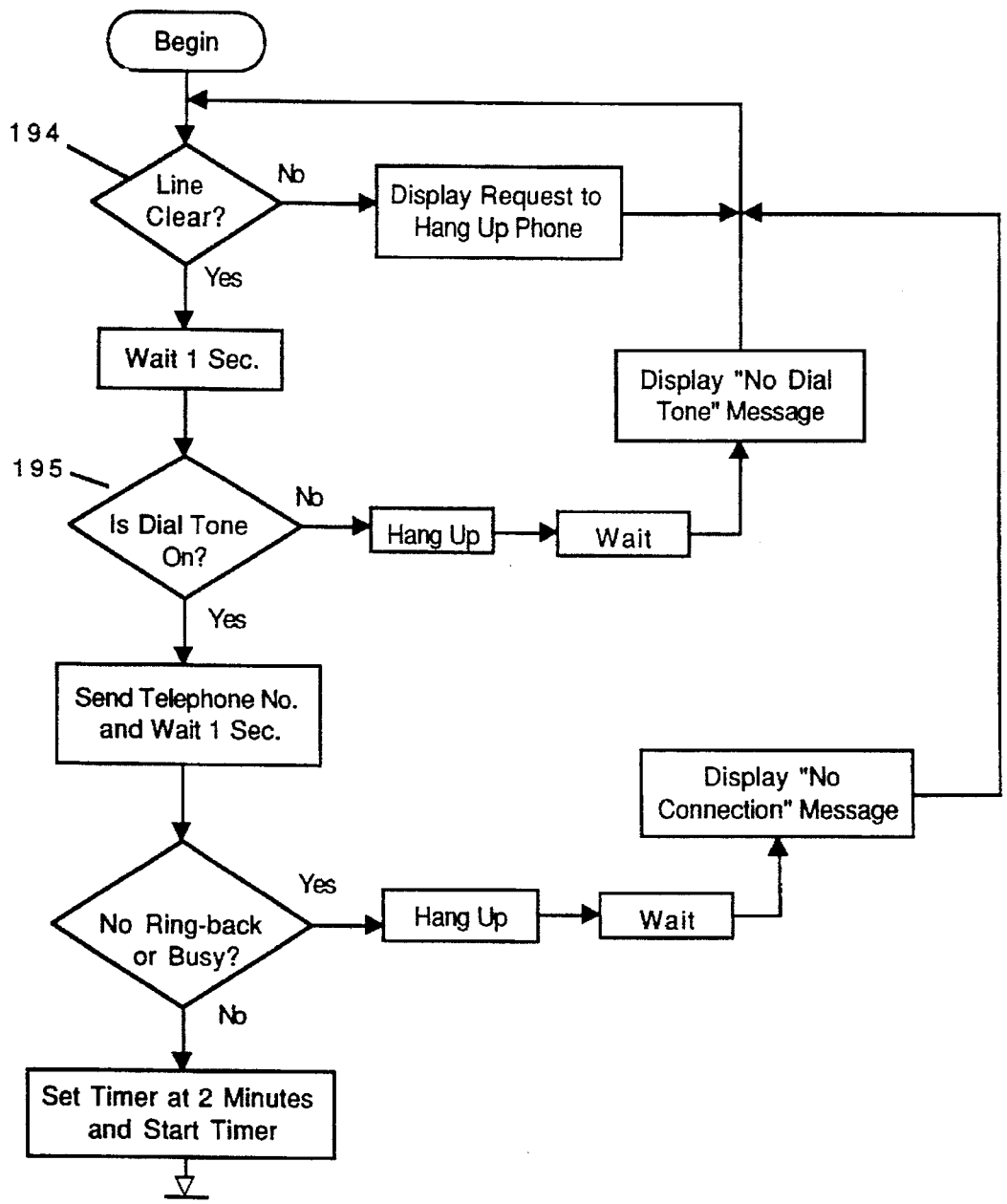
FIGS. 15A and 15B are a flow chart showing a modified operating sequence for automatic reporting of faults within or external to the present system.
Figure 15B:
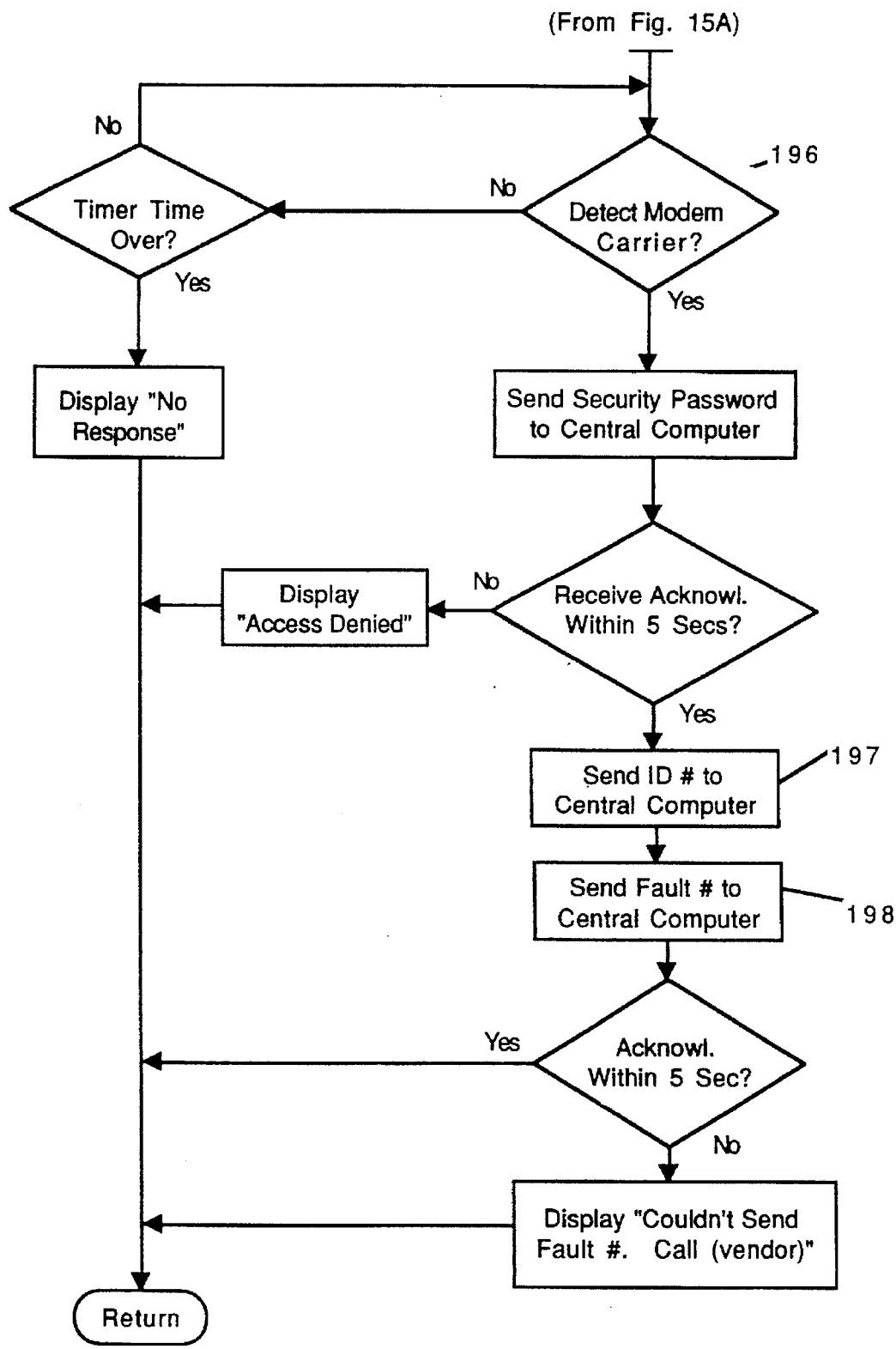
Figure 16A:
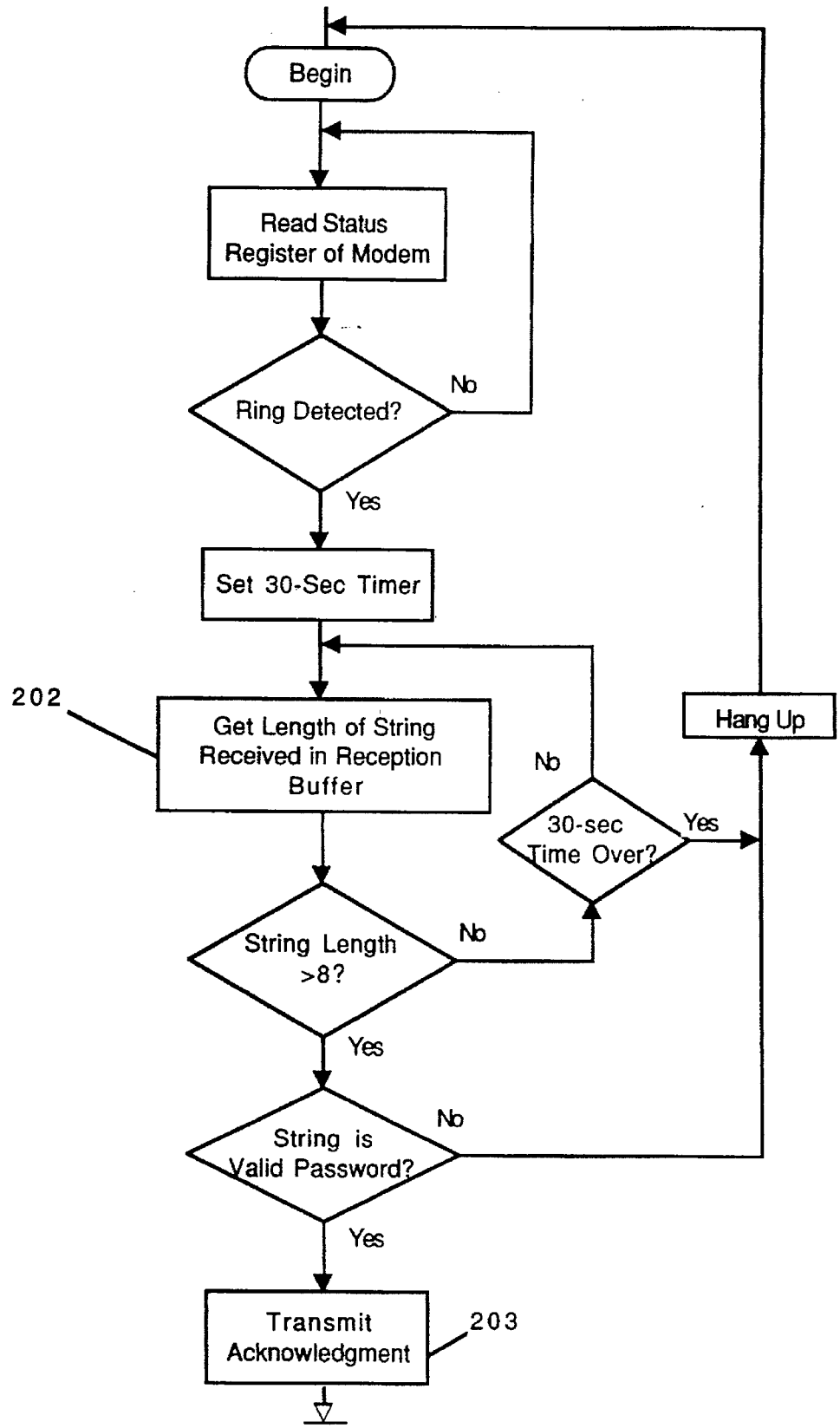
FIGS. 16A and 16B are a flow chart showing the operation of a central location for receiving faults reported by the operating sequence of FIGS. 15A and 15B.
Figure 16B:
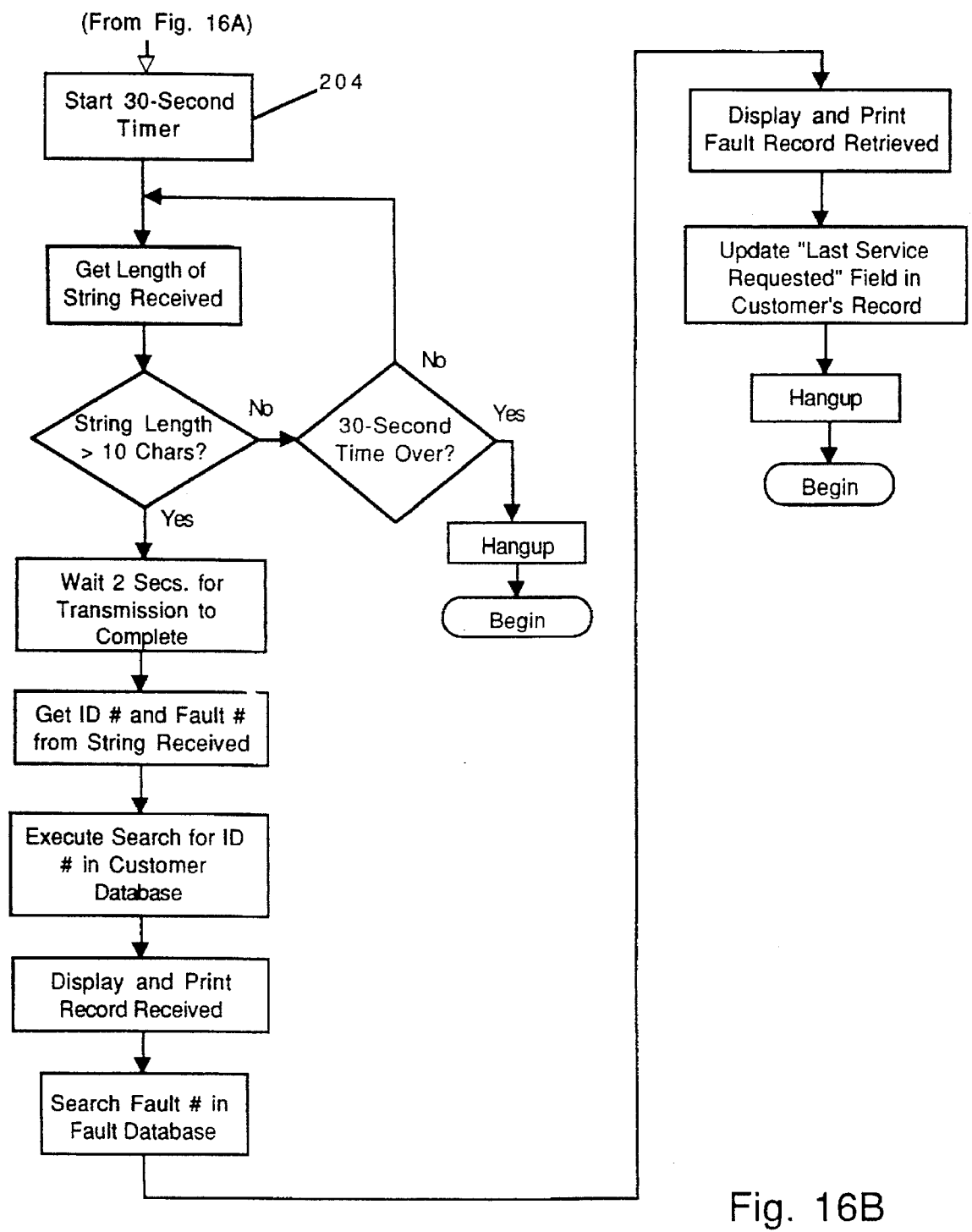

FIGS. 15A and 15B show a flowchart describing a procedure for reporting faults or other information to a central computer according to the present invention, and FIGS. 16A and 16B show a flowchart of a procedure disclosing central-computer processing of information received over telephone lines from wastewater treatment systems according to the present invention. Turning first to FIG. 15A, it is assumed that the controller 95 (FIG. 4) has received an input signal corresponding to an event requiring some operator attention or corrective action. As previously described, this event can be a fault within the wastewater treatment system or an event external to the system. In any case, the CPU 96 responds to the event by initializing the modem 104 and initiating a dial-up sequence for connecting the controller 95 to a central computer by means of the conventional telephone line 106. This beginning sequence requires determining that the telephone line is clear, as indicated at 194 in FIG. 15A. If the telephone line is off-hook at the time, the controller displays a request on the terminal 101 to hang up the phone. After displaying that request, the operating sequence continues to look for a clear telephone line. Once that line becomes available, the system looks for the occurrence of dial tone as indicated at 195 in FIG. 15A. If no dial tone is present, the modem hangs up the phone and a "No Dial Tone" message is displayed on the terminal 101, after which the operating sequence repeats.

If a dial tone is detected, the modem 104 is commanded to send the predetermined telephone number for accessing the central computer. Once that dial string is completed, the system waits one second and then looks for the appearance of a ring-back signal or a busy signal on the telephone line. If either signal occurs, the modem hangs up the telephone line and the terminal 101 displays a message indicating that no connection was made. The operating sequence then repeats until a connection is completed.

If ring-back or busy signal is not detected at 196, FIG. 15B, the appearance of an incoming modem carrier signal on the telephone line indicates that the call has been completed and that a modem is present at the receiving end. In response to carrier detection, the system sends a security password and waits for proper acknowledgment from the central computer at the receiving end. If this password is acknowledged, the CPU 96 associated with the controller 95 sends to the central computer an identification number corresponding to the particular wastewater treatment installation as indicated at 197, and also sends a fault number corresponding to the predetermined event that caused the controller 95 to initiate the call. It should be understood that this fault number can identify a particular malfunction within the wastewater treatment system, or alternatively can identify some event external to the system. For example, particular external fault numbers could correspond to an intrusion alarm or a smoke-detector alarm.

After sending the fault number to the central computer, the system waits for an acknowledgment signal from the central computer. If that acknowledgment is received within five seconds or another appropriate predetermined time, the event-reporting sequence is completed and the system returns to an initial state. As part of this return, the modem 104 releases the telephone line 106, which becomes available for other calls or for placing another fault call by the controller 95.

These procedures require a full-duplex modem 104 (FIG. 4) associated with the controller 95 for relatively high-speed data communication with the central computer. However, a relatively low-speed alternative (requiring commensurately lower-cost hardware), substituting a DTMF (Dual Tone Multiple Frequency) transceiver for the modem, can transmit the system identification number and selected fault numbers to the central location by providing DTMF signals corresponding to the multibit data stored in transmit registers of the DTMF transceiver.

The central computer maintains a database of homeowners or other subscribers to wastewater treatment systems according to the present invention, in a particular locality or other service area. This database typically includes the name, address, and telephone number of each subscriber, directions to the subscriber's location, and a table of fault numbers, fault descriptions, and suggested remedies associated with each particular subscriber. For subscribers whose wastewater treatment systems can respond to events occurring outside the system, those suggestions would include instructions to call a preselected security agency or the local fire department, for example. Adaptations of the present system used for reporting utility-meter readings can be programmed to dial alternative telephone numbers for reporting to a central computer maintained by the appropriate utility for that purpose, instead of the central computer maintained for monitoring faults detected by the wastewater treatment system.

Turning to FIG. 16A, the operation of the central computer reporting is shown for the preferred embodiment of the present system. It is assumed that one or more dial-up telephone lines are connected to corresponding modems associated with the central computer. When one of the modems detects a ring signal, the modem picks up the calling line and executes a handshake sequence with the calling modem in the usual manner. The program then waits until it receives at least eight characters (the length of the identification string) or until a 30-second wait period is over, as shown at the step 202. If too few characters are received within the wait period, the controller 95 tells the modem to hang up the incoming call.

If at least eight characters are received within the wait period, the central computer determines whether that data string corresponds to a valid password for the central computer, and if so, transmits an acknowledgment signal to the calling party as indicated at 203. The present system then sets another 30-second wait period as shown at 204, FIG. 16B, and looks for another data string received during that time. Once again, the modem will hang up the call if a data string length within a predetermined number of characters is not received within a 30-second wait period.

If a data string of the appropriate length is received, the central computer gets the identification number and the fault number from that string. The computer then looks up the identification number in the customer database to identify the particular customer, and looks in the fault database to identify the particular fault corresponding to that latter number. From the customer and fault information, the computer then displays and prints a fault record containing the appropriate information, together with other data such as the date and time of receiving the fault, and so on. The customer's record in the computer then is updated to indicate this latest service request. Following that update, the modem is instructed to hang up the line and the central computer system then awaits the next incoming call from a wastewater treatment system.

FIG. 17 shows a modification of the wastewater system controller to be reprogrammable by downloading code from the central computer over a telephone line. This modified controller, designated as 95' in FIG. 17, provides the present wastewater treatment apparatus with significantly improved flexibility, because the control algorithms can be reprogrammed to meet the specific operational requirements of an individual onsite treatment plant based on factors such as the observed operating history for the home at that site, or to receive upgrades or enhancements in the computer operating systems for the wastewater treatment apparatus.

The controller 95' includes a flash memory 210, a boot memory 211, and a control logic module 212 connected to the bus 97 of the controller board. It will be understood that the bus 97 connects to other elements of the controller as previously described with regard to FIG. 4. The flash memory 210 stores the operating program and allows reprogrammability. The boot memory 211 contains boot code required for handling basic communication and reprogramming of the flash memory, in response to the control logic fixed in the module 212.

Figure 18A:
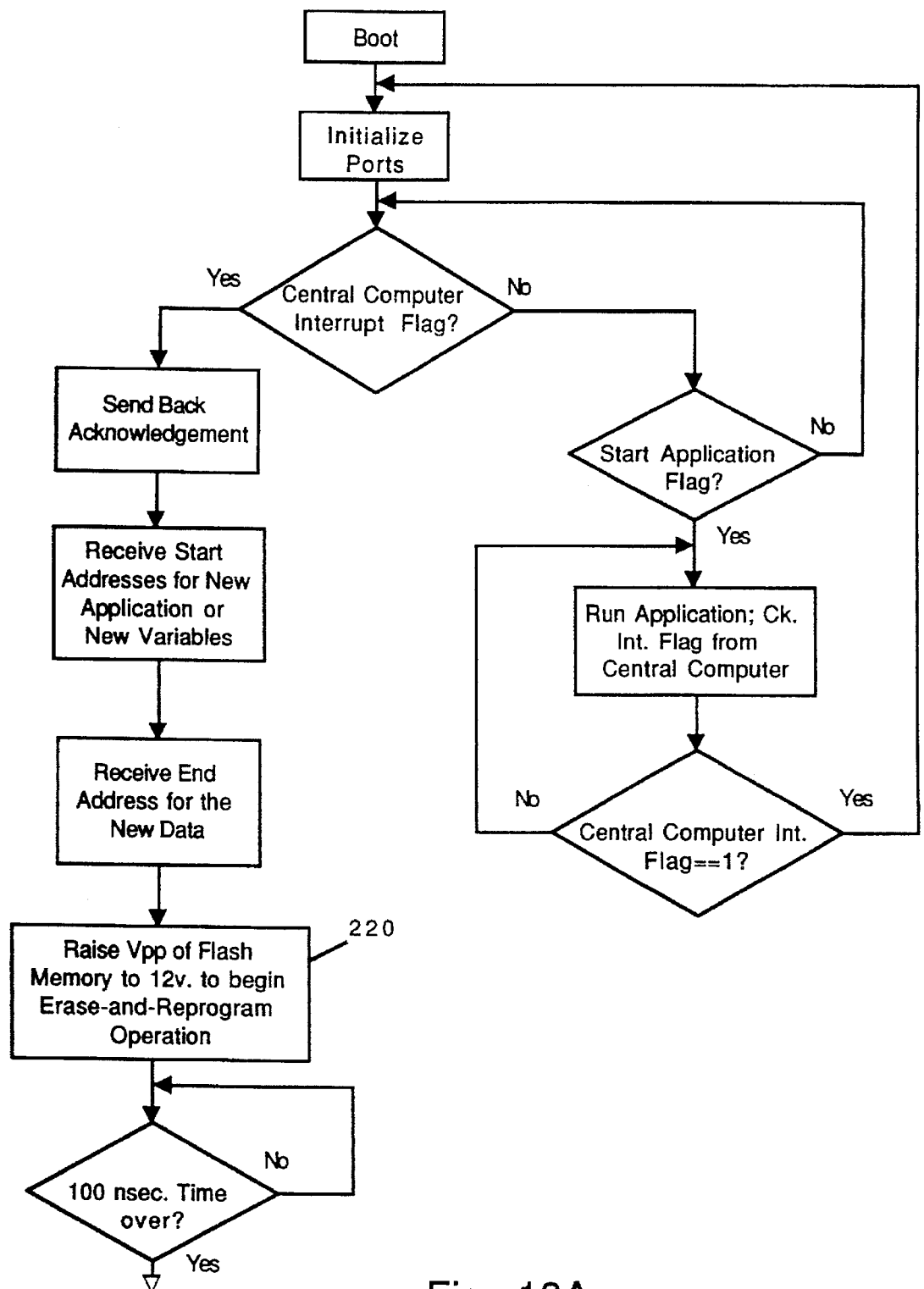
FIGS. 18A–18C are a block diagram showing the operation of automatic reprogramming according to FIG. 17.
Figure 18B:
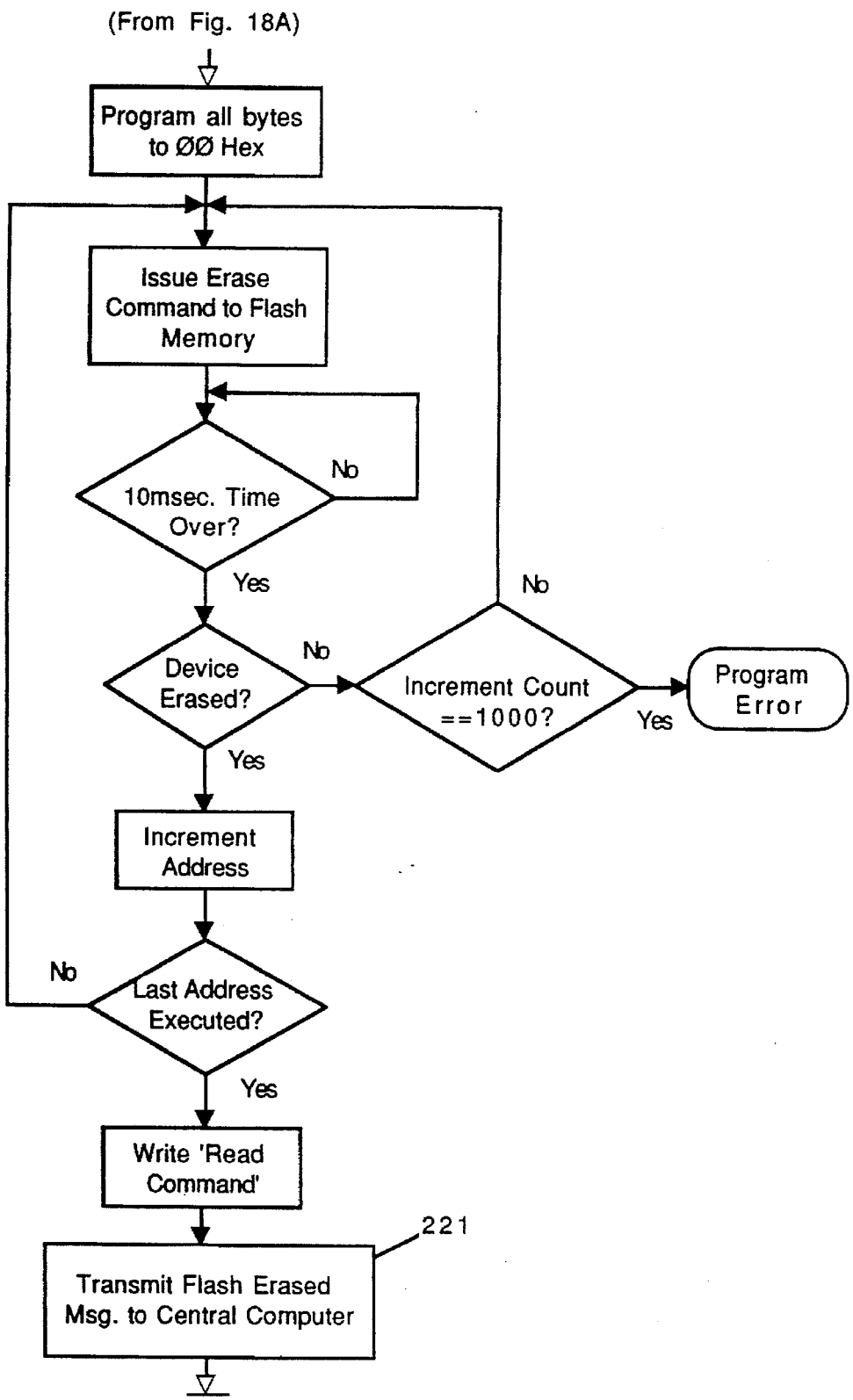
Figure 18C:
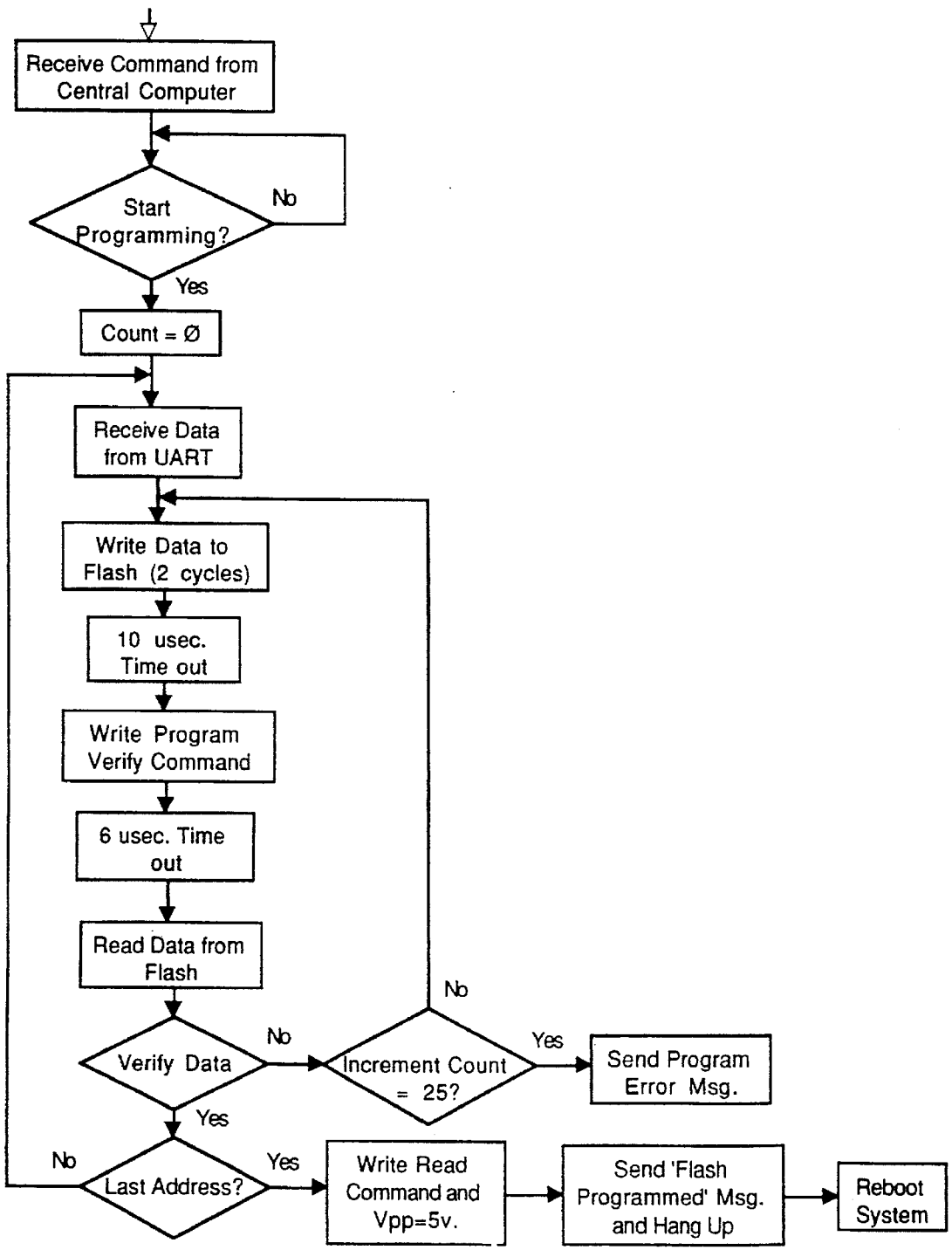

FIGS. 18A–18C depicts a software algorithm used for remote programming of the apparatus shown in FIG. 17. For example, remote programming of a particular onsite wastewater treatment plant can be initiated in response to sensor signals received from the plant and determined to indicate that a measured operating condition at the onsite plant has moved outside a predetermined nominal value for that operating condition. That determination can be made by comparing the measured condition signals received from the onsite plant with nominal-condition signals previously determined and stored at the central location. Responding to such a determination, the central computer is programmed to modify the operating program previously stored at the plant in a manner determined to return the measured operating condition to the nominal value. After the controller 95' establishes a connection with the central computer through the modem 104 and telephone line 106, the controller receives instructions as shown at 220 to initiate a sequence to erase and reprogram the flash memory 210. After the flash memory is erased, a signal to that effect is sent to the central computer as indicated at 221, FIG. 18B. In response thereto, the central computer sends a reprogramming command to the controller 95' and begins sending data corresponding to the new program, which is stored in the flash memory. After that data is transmitted and verified, the modem 104 is commanded to hang up the telephone line and the CPU 96 is rebooted to execute the newly-loaded program.

The sewage treatment miniplant systems disclosed herein include a microprocessor located at each residence or other local site where the system is installed. The microprocessors in those systems can be utilized as a gateway for transferring other kinds of information to and from the local sites, in addition to information about system operation or other events occurring at the local sites as described above. One example of the greater information-transfer capabilities for the present system is described with respect to FIG. 19. In that figure, a number of individual sewage treatment miniplant systems as described herein are denoted at 250 and 252. For illustrative purposes, the individual systems 250 are assumed to be located in a geographic area separate from the location of the individual systems 252, but the adjacency or remoteness of those two groups of individual systems is not a limiting factor. Each individual system 250 is connected to a telephone exchange 254 by a data link having bandwidth suitable for the particular purpose as discussed below. Likewise, each of the individual systems 252 is connected to a different local telephone exchange 255 serving the locations of those individual systems. The telephone exchanges are shown connected to a central accounting facility 257 which maintains a central computer for accounting and billing purposes as described above, and those connections can be conventional dial-up connections using voice-grade lines. The central accounting facility 257 thus may query the various individual systems 250, 252 for data concerning utility usage metered by those systems, and may receive information from the individual systems corresponding to other events such as intrusion alarms, system malfunctions, or otherwise. It will be understood that the central accounting facility 257 may be operated by a private agency contracting with the utility suppliers and the homeowners using the individual systems 250, 252, or in the alternative may be operated by one or more local governments where the individual systems are sited.

The individual telephone exchanges 254, 255 also are connected to a central programming/media location 260 by suitable data links 261. The remote programming/media site 260 contains a central computer capable of sending programming updating and other operating information to the individual systems 250, 252 through the telephone exchanges, as previously described. In addition, the central location 260 also provides access to other forms of data external to the needs of the individual onsite sewage treatment miniplant systems but nonetheless accessible through the processors of those systems. For that access, the microprocessors contained in the individual systems 250, 252 are connected to a suitable input-output terminal 264. Terminal hardware architecture of the input-output terminals 264 can be similar to that of the main controller for the onsite system and should provide an easy user interface. For example, the terminal can provide a graphical LCD display and accept data from a keypad on a front panel. The terminal also can accept a coded RF signal from a remote keypad, as well as signals from sensors used for home security, smoke detection, and so on. Alternatively, personal computers equipped with suitable terminal emulation software can function as the terminals 264 at some or all individual systems 250, 252. As still another alternative, the input-output terminals 264 at some or all of the individual systems can comprise a television receiver equipped with a suitable broadband converter enabling the receiver to select from a plurality of available channels. The TV-converter combination can include a keypad or other input device for two-way interactive communication with the remote programming/media site 260.

Figure 19:
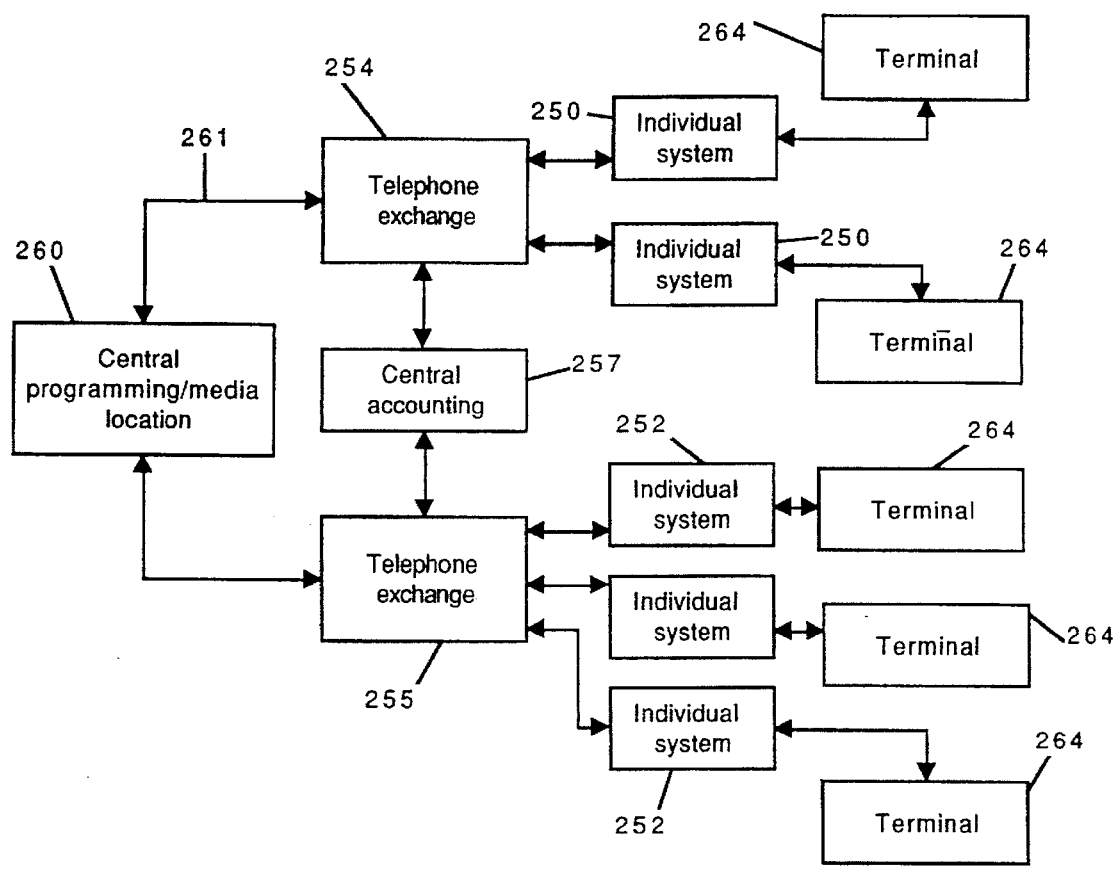
FIG. 19 is a block diagram showing an expanded system of information exchange utilizing apparatus according to a preferred embodiment of the present invention.

The greater system as thus described and shown in FIG. 19 uses the microprocessors of the individual systems to deliver any available information capable of being digitized and transmitted over appropriate communication channels. For example, the remote central programming/media location can make available to the individual sites real-time television programming and other information of the kind presently transmitted over cable-TV networks. The central location 260 can also be an access provider to databases containing information such as encyclopedias, directories, current newspapers and magazines, educational programs, video games, airline schedules, and other sources, without any need for a local storage medium such as hard disk or a flopping disk drive.

It will be evident to those skilled in the art that the data links 261 between the central location 260 and the telephone exchanges, and the links between those exchanges and the individual systems 250, 252, must be broadband links to accommodate real-time transmission program material such as of video signals and the like. Current technologies for providing such broadband communication include satellite links, particularly for the links 261 between the central location 260 and the telephone exchanges, and coaxial cable and fiber-optic cable. Although the present embodiment utilizes telephone exchanges as exemplary switches between the individual systems and the central location, that example is not intended to restrict the application of the present invention. For example, cable operators, using either coaxial or fiber technologies, can provide the appropriate information-signal paths between the individual systems 250, 252 and the central location. Other technologies for accomplishing the requisite broadband data transmission may become known to the art and would be contemplated for use in the present system.

It should be understood that the foregoing relates only to a preferred embodiment of the present invention, and that numerous changes and modifications thereto may be made without departing from the spirit and scope of the invention as defined in the following claims.

What is claimed is:

1. A process for aerobic treatment of wastewater containing organic matter, comprising the steps of:

collecting wastewater flowing into a first tank;

aerating the wastewater in the first tank to promote aerobic treatment of organic matter in the wastewater;

when a predetermined amount of wastewater is in the first tank, transferring a batch of wastewater from the first tank to a second tank until a predetermined level of wastewater is reached in the second tank;

aerating the batch of wastewater in the second tank for further aerobic treatment of organic matter remaining therein, while continuing to collect wastewater flowing into the first tank, and then;

clarifying the aerated batch of wastewater in the second tank by allowing the wastewater to settle so that sludge remaining in the wastewater settles to the bottom of the second tank and a clear supernatant liquid from the treated wastewater overlies the settled sludge in that tank;

transferring the clear supernatant liquid from the second tank for dispersal;

transferring the settled sludge from the second tank to the first tank so that the transferred sludge combines with organic matter in the wastewater continuing to enter the first tank, thereby augmenting an aerobic biomass in the first tank; and adding no wastewater to the second tank during the steps of aerating the batch in the second tank, clarifying the aerated batch, transferring supernatant from the second tank, and transferring sludge from the second tank, whereby the batch of wastewater undergoes treatment in the second tank without disturbance or dilution by incoming wastewater.

2. The process as in claim 1, wherein:

the steps of aerating the batch of wastewater in the second tank, clarifying that batch by allowing sludge forming in the wastewater to settle and allowing clear supernatant liquid to overlie the settled sludge in the second tank, and transferring the clear supernatant liquid from the second tank, are repeated at least once for at least a second step of clarification in the second tank before the settled sludge is transferred to the first tank.

3. The process as in claim 2, further comprising:

transferring another batch of wastewater from the first tank to the second tank where the second tank is substantially empty after said at least second step of clarification and a predetermined amount of wastewater is in the first tank.

4. The process as in claim 1, wherein the step of transferring liquid from the second tank comprises periodically spraying a portion of that liquid onto the interior wall of the second tank so as to prevent sludge from accumulating on that interior wall, thereby returning that sludge to the remainder of the batch of wastewater in the second tank.

5. A process for aerobic treatment of wastewater containing organic matter, comprising the steps of:

collecting the wastewater in a settling tank to allow removal of settleable solids from the wastewater by sedimentation;

flowing wastewater from the settling tank to an intermediate tank;

aerating the wastewater in the intermediate tank to mix the wastewater and to promote aerobic treatment of organic matter in the wastewater;

transferring a batch of wastewater from the intermediate tank to an aerator-clarifier tank until a predetermined level of wastewater is reached in the aerator-clarifier tank;

allowing the batch of wastewater in the aerator-clarifier tank to stand undisturbed to allow scum that forms in the wastewater to separate and float to the surface, and then;

removing a top layer of liquid from the aerator-clarifier tank so as to remove the floating scum;

retaining the remainder of the batch of wastewater in the aerator-clarifier tank for a predetermined time while aerating the wastewater for further aerobic treatment of organic matter remaining therein, and then;

clarifying the aerated batch of wastewater in the aerator-clarifier tank by allowing the wastewater to settle so that sludge remaining in the wastewater settles to the bottom of the aerator-clarifier tank and a clarified supernatant liquid from the treated wastewater overlies the settled sludge;

transferring the clarified supernatant liquid from the aerator-clarifier tank for dispersal; and transferring the settled sludge from the aerator-clarifier tank to the intermediate tank so that the returned sludge combines with organic matter in the wastewater entering the intermediate tank from the settling tank, thereby augmenting an aerobic biomass in the intermediate tank.

6. The process as in claim 5, comprising the further step of transferring another batch of wastewater from the intermediate tank to the aerator-clarifier tank for aerobic treatment, after the supernatant liquid is transferred from the aerator-clarifier tank and the sludge is transferred to the intermediate tank.

7. The process as in claim 5, wherein:

no wastewater is added to the batch of wastewater undergoing aeration and clarification in the aerator-clarifier tank, so that said aeration and clarification occur separately for each batch of wastewater transferred to the aerator-clarifier tank without disturbance from wastewater entering from the intermediate tank.

8. The process as in claim 7, wherein:

wastewater can continue to flow from the settling tank to the intermediate tank while the batch of wastewater within the aerator-clarifier tank undergoes aeration and clarification; and another batch of wastewater is transferred from the intermediate tank to the aerator-clarifier tank when the aerator-clarifier tank is substantially empty and a predetermined amount of wastewater is in the intermediate tank.

9. The process as in claim 7, wherein wastewater can continue to flow from the settling tank to the intermediate tank while the batch of wastewater within the aerator-clarifier tank undergoes aeration and clarification.

10. The process as in claim 5, wherein a batch of wastewater is transferred from the intermediate tank to the aerator-clarifier tank when the aerator-clarifier tank is substantially empty and the amount of wastewater in the intermediate tank rises to a predetermined level.

11. The process as in claim 4, wherein:

the steps of aerating the batch in the aerator-clarifier tank, clarifying that batch, and transferring the clear supernatant liquid from the batch, are repeated at least once before transferring the settled sludge to the intermediate tank.

12. The process as in claim 5, wherein:

the step of clarifying the batch is repeated at least once before the aerator-clarifier tank is substantially empty, followed by transferring another batch of wastewater from the intermediate tank to the aerator-clarifier tank for clarification.

13. The process as in claim 5, wherein the batch of wastewater is transferred from the intermediate tank to the aerator-clarifier tank when the amount of wastewater in the intermediate tank rises to a predetermined level.

14. The process as in claim 5, wherein:

wastewater can continuously flow from the settling tank to the intermediate tank; and the batch of wastewater is transferred from the intermediate tank to the aerator-clarifier tank when the wastewater in the intermediate tank rises to a predetermined level.

15. The process as in claim 5, comprising the further steps of:

disinfecting the supernatant liquid transferred from the aerator-clarifier tank to remove bacteria remaining in that liquid; and then pumping the disinfected liquid into a proximal end of a drip irrigation line while closing a distal end of the line drip irrigation to maintain back pressure in the line, followed by opening the distal end while maintaining the pumping, so as to flush the drip irrigation line of solids accumulated from the liquid pumped through the line.

16. Apparatus for aerobic treatment of wastewater containing organic matter, comprising:

a first tank operative to receive a continuing flow of wastewater;

a source of air supplied to the wastewater in the first tank so that said wastewater undergoes aerobic treatment to create an aerobic biomass;

a second tank;

means selectively operative to transfer a batch of the treated wastewater from the first tank to the second tank until a predetermined level of wastewater is reached in the second tank;

means operative to allow the batch of wastewater to stand undisturbed in the second tank so as to allow scum that forms in the wastewater to separate and float to the surface, and then operative to remove a top layer of liquid from the second tank so as to remove the floating scum;

means supplying a source of air for a predetermined time to the batch of wastewater in the second tank so that the wastewater undergoes further aerobic treatment followed by clarification after the air no longer is supplied to the batch, whereupon sludge remaining in the wastewater settles to the bottom of the second tank and a clear supernatant liquid from the treated wastewater overlies the settled sludge;

means operative to remove a top layer of the clear supernatant liquid from the second tank and transfer the removed liquid for dispersal; and means operative to transfer settled sludge from the second tank to the first tank so that the transferred sludge combines with organic matter in the continuing flow of wastewater entering the first tank, thereby augmenting the aerobic biomass in the first tank.

17. The apparatus as in claim 16, wherein:

the means operative to remove a top layer of the clear supernatant liquid comprises a buoyant member floating in the second tank;

a collector carried by the buoyant member at a predetermined depth below the surface so that the collector is receptive to a top layer of liquid in the second tank; and a conduit in flow communication with the collector and leading to the inlet of a pump, so that the top layer of liquid in the tank is removed in response to operation of the pump.

18. The apparatus as in claim 10, comprising:

means operative to transfer another batch of wastewater from the first tank for aerobic treatment, after the sludge is transferred to the first tank.

19. The apparatus as in claim 16, wherein:

the means for transferring a batch of wastewater to the second tank is inoperative while wastewater is undergoing aerobic treatment and clarification in the second tank, so that said aerobic treatment and clarification occur without interruption by further wastewater transferred to the second tank.

20. The apparatus as in claim 16, further comprising:

separate means responsive to the levels of wastewater in the first and second tanks to initiate transfer of a batch of wastewater from the first tank to the second tank when the second tank is substantially empty and the amount of wastewater in the first tank rises to a predetermined level.

21. Apparatus as in claim 16, further comprising:

a sprayer within the second tank and disposed to direct a liquid spray onto an interior wall of the second tank; and means operative in response to removal of at least part of the wastewater from the second tank to operate the sprayer, so as to prevent sludge from drying and accumulating on the interior wall of the second tank.

22. Apparatus as in claim 21, wherein the means to operate the sprayer to pump supernatant liquid from the top layer in the second tank and supply the pumped liquid to the sprayer.

23. Apparatus as in claim 16, further comprising:

a sprayer within the first tank and disposed to direct a liquid spray onto an interior wall of the first tank; and means operative to operate the sprayer in a predetermined manner to wash the interior wall and keep that wall moist, so that solids do not remain on the wall to dry and become encrusted.

24. Apparatus in claim 16, further comprising:

means within the first tank selectively operative to direct a jet of pumped liquid into the liquid in that tank so as to churn the liquid in the first tank, thereby mixing the biomass therein with wastewater flowing into the first tank and promoting aerobic activity within that tank.

25. Apparatus as in claim 24, wherein the means to direct a jet comprises an internal mixer disposed for immersion in liquid within the first tank whenever the first tank is at least partially filled and operative to entrain that liquid with the jet of pumped liquid, so as to mix the contents of the first tank.

26. Apparatus as in claim 25, wherein the means to direct a jet is operative to direct the jet of liquid toward the bottom of the first tank, so as to mix the biomass within the first tank with the wastewater flowing into that tank.

27. Apparatus as in claim 16, further comprising:

means selectively operative to transfer settled sludge from the second tank and waste that removed sludge outside the wastewater undergoing aerobic treatment by the apparatus.

28. A microprocessor-controlled apparatus for aerobic treatment of wastewater containing organic matter, comprising:

a settling tank receiving the wastewater and allowing solids to settle within the tank;

an intermediate tank receiving a continuous outflow of wastewater liquid and floatable material from the settling tank so as to undergo aerobic treatment to create an aerobic biomass in the intermediate tank;

an aerator-clarifier tank;

first liquid transfer means including an inlet for withdrawing wastewater material from the intermediate tank and transferring that material to the aerator-clarifier tank so that the wastewater undergoes further aerobic treatment and clarification in the aerator-clarifier tank;

second liquid transfer means including an inlet to withdraw a supernatant layer of liquid from the aerator-clarifier tank and transfer the removed liquid for subsequent dispersal;

third liquid transfer means including an inlet for withdrawing material at the bottom of the aerator-clarifier tank and transferring that material to the intermediate tank; and a microprocessor operatively associated with the first, second, and third liquid transfer means and programmed to form means to transfer a predetermined batch of wastewater from the intermediate tank to the aerator-clarifier tank via the first means; means to clarify the batch of wastewater in the aerator-clarifier tank by allowing the wastewater to settle so that sludge in the wastewater settles to the bottom of the aerator-clarifier tank and a supernatant liquid from the wastewater; means to transfer the supernatant liquid from the aerator-clarifier tank via the second means for dispersal; means to transfer the settled sludge from the aerator-clarifier tank to the intermediate tank via the third liquid transfer means so that the returned sludge combines with organic matter in the wastewater entering the intermediate tank from the settling tank, thereby augmenting the aerobic biomass in the intermediate tank; and means to transfer no wastewater to the aerator-clarifier tank during operation of the means to clarify, the means to transfer supernatant liquid, and the means to transfer settled sludge, so that the batch of wastewater undergoes treatment in the aerator-clarifier tank without disturbance or dilution by additional wastewater.

29. Apparatus as in claim 28, wherein the microprocessor is further programmed to form means to repeat the steps of allowing the wastewater to settle in the aerator-clarifier tank and transferring supernatant liquid from the aerator-clarifier tank at least once before transferring the settled sludge from the aerator-clarifier tank to the intermediate tank.

30. Apparatus as in claim 28, further comprising:

means operative to aerate the contents of the intermediate tank so as to stimulate the growth of microorganisms in the contents;

means operative in response to the microprocessor to aerate the contents of the aerator-clarifier tank so as to stimulate the growth of microorganisms in the contents; and the microprocessor is further programmed to form means to aerate the batch of wastewater transferred to the aerator-clarifier tank for a certain time, and then to allow that wastewater to stand undisturbed for a period of time to allow floatable scum to rise to the surface of the wastewater in the aerator-clarifier tank, and then to operate the second liquid transfer means to remove the scum from the aerator-clarifier tank, after which the microprocessor is operative to allow the wastewater to settle for a predetermined time, and then operate the third means to transfer the supernatant liquid.

31. Apparatus as in claim 28, further comprising:

means operative to introduce at the bottom of the intermediate tank a supply of pressurized air to aerate the contents of that tank so as to stimulate the growth of microorganisms therein;

means operative to introduce at the bottom of the aerator-clarifier tank a supply of pressurized air to aerate the contents of that tank so as to stimulate the growth of microorganisms in the batch of wastewater transferred to that tank;

separate means operative to produce first and second signals in response to the respective back pressures of the pressurized air being introduced to the intermediate tank and the aerator-clarifier tank, so that the signals have a predetermined correspondence to the liquid levels in the tanks; and means connecting the signals to the microprocessor so that the microprocessor is responsive to the liquid levels in the intermediate and aerator-clarifier tank.

32. Apparatus as in claim 31, wherein:

the microprocessor is programmed to form means to operate the first liquid transfer means to transfer the predetermined batch of wastewater from the intermediate tank to the aerator-clarifier tank when the pressure signal for the intermediate tank corresponds to a predetermined high level of liquid therein and the second and third liquid transfer means has substantially withdrawn from the aerator-clarifier tank a batch of wastewater previously transferred to that tank.

33. Apparatus as in claim 32, wherein:

the microprocessor is programmed to form means to continuously monitor the first liquid level signal and, in response to a predetermined level signal corresponding to a level of liquid in the intermediate tank at risk of exceeding the capacity of that tank, to operate the first liquid transfer means to withdraw wastewater from the intermediate tank until either the second level signal indicates that the level of liquid in the aerator-clarifier tank has risen to a predetermined level or the first level signal indicates that the level of liquid in the intermediate tank has dropped to a predetermined level.

34. A process for aerobic treatment of wastewater containing organic matter, comprising the steps of:

collecting wastewater flowing into a first tank;

aerating the wastewater in the first tank to promote aerobic treatment of organic matter in the wastewater;

when a predetermined amount of wastewater is in the first tank, transferring a batch of wastewater from the first tank to a second tank until a predetermined level of wastewater is reached in the second tank;

aerating the batch of wastewater in the second tank for further aerobic treatment of organic matter remaining therein, while continuing to collect wastewater flowing into the first tank, and then;

clarifying the aerated batch of wastewater in the second tank by allowing the wastewater to settle so that sludge remaining in the wastewater settles to the bottom of the second tank and a clear supernatant liquid from the treated wastewater overlies the settled sludge in that tank:

transferring the clear supernatant liquid from the second tank for dispersal;

transferring the settled sludge from the second tank to the first tank so that the transferred sludge combines with organic matter in the wastewater continuing to enter the first tank, thereby augmenting an aerobic biomass in the first tank;

allowing the batch of wastewater in the second tank to stand undisturbed so that scum that forms in the wastewater separates and floats to the surface, and then;

removing the floating scum from the liquid in the second tank, followed by;

again aerating the remainder of the batch of wastewater in the second tank for further aerobic treatment of organic matter therein; and then clarifying the again-aerated batch of wastewater in the second tank.

35. A process for aerobic treatment of wastewater containing organic matter, comprising the steps of:

collecting the wastewater in an intermediate tank;

aerating the wastewater in the intermediate tank to mix the wastewater and to promote aerobic treatment of organic matter in the wastewater;

transferring a batch of wastewater from the intermediate tank to an aerator-clarifier tank until a predetermined level of wastewater is reached in the aerator-clarifier tank;

allowing the batch of wastewater in the aerator-clarifier tank to stand undisturbed to allow scum that forms in the wastewater to separate and float to the surface, and then;

removing a top layer of liquid from the aerator-clarifier tank so as to remove the floating scum;

retaining the remainder of the batch of wastewater in the aerator-clarifier tank for a predetermined time while aerating the wastewater for further aerobic treatment of organic matter remaining therein, and then;

clarifying the aerated batch of wastewater in the aerator-clarifier tank by allowing the wastewater to settle so that sludge remaining in the wastewater series to the bottom of the aerator-clarifier tank and a clarified supernatant liquid from the treated wastewater overlies the sealed sludge;

transferring the clarified supernatant liquid from the aerator-clarifier tank for dispersal; and transferring the settled sludge from the aerator-clarifier tank to the intermediate tank so that the returned sludge combines with organic matter in the wastewater entering the intermediate tank from the settling tank, thereby augmenting an aerobic biomass in the intermediate tank.

36. The process as in claim 35, wherein:

wastewater can continue to flow to the intermediate tank while the batch of wastewater within the aerator-clarifier tank undergoes aeration and clarification; and another batch of wastewater is transferred from the intermediate tank to the aerator-clarifier tank when the aerator-clarifier tank is substantially empty and a predetermined amount of wastewater is in the intermediate tank.

37. The process as in claim 35, wherein:

the steps of aerating the batch in the aerator-clarifier tank, clarifying that batch, and transferring the clear supernatant liquid from the batch, are repeated at least once in the aerator-clarifier tank before transferring the settled sludge to the intermediate tank.

38. A process for aerobic treatment of wastewater containing organic matter, comprising the steps of:

collecting wastewater flowing into a first tank;

aerating the wastewater in the first tank to promote aerobic treatment of organic matter in the wastewater;

when a predetermined amount of wastewater is in the first tank, transferring a batch of wastewater from the first tank to a second tank until a predetermined level of wastewater is reached in the second tank;

aerating the batch of wastewater in the second tank for further aerobic treatment of organic matter remaining therein, while continuing to collect wastewater flowing into the first tank, and then;

clarifying the aerated batch of wastewater in the second tank by allowing the wastewater to settle so that sludge remaining in the wastewater settles to the bottom of the second tank and a clear supernatant liquid from the treated wastewater overlies the settled sludge in that tank;

transferring a quantity of the settled sludge from the second tank to the first tank at periodic intervals during the step of clarification before the sludge begins to undergo denitrification in second tank;

transferring the clear supernatant liquid from the second tank for dispersal; and then transferring to the first tank the settled sludge remaining in the second tank at the end of the step of clarification;

so that the transferred sludge combines with organic matter in the wastewater continuing to enter the first tank, thereby augmenting an aerobic biomass in the first tank.

39. The process as in claim 38, wherein:

the steps of aerating the batch of wastewater in the second tank, clarifying that batch by allowing sludge forming in the wastewater to settle and allowing clear supernatant liquid to overlie the settled sludge in the second tank, periodically transferring a quantity of settled sludge to the first tank before denitrification begins during clarification, and transferring the clear supernatant liquid from the second tank, are repeated at least once for at least a second step of clarification in the second tank before the remaining settled sludge is transferred to the first tank.

40. Apparatus for aerobic treatment of wastewater containing organic matter, comprising:

a first tank operative to receive a continuing flow of wastewater;

a source of air supplied to the wastewater in the first tank so that said wastewater undergoes aerobic treatment to create an aerobic biomass;

a second tank;

means selectively operative to transfer a batch of the treated wastewater from the first tank to the second tank until a predetermined level of wastewater is reached in the second tank;

means supplying a source of air for a predetermined time to the batch of wastewater in the second tank so that the wastewater undergoes further aerobic treatment followed by clarification after the air no longer is supplied to the batch, whereupon sludge remaining in the wastewater settles to the bottom of the second tank and a clear supernatant liquid from the treated wastewater overlies the settled sludge;

means operative at predetermined intervals during clarification to transfer a quantity of the settled sludge from the second tank to the first tank at a time before the sludge begins to undergo denitrification in the second tank;

means operative to remove a top layer of the clear supernatant liquid from the second tank and transfer the removed liquid for dispersal; and means operative after removal of the supernatant liquid to transfer to the first tank the settled sludge remaining in the second tank at the end of clarification;

so that the transferred sludge combines with organic matter in the continuing flow of wastewater entering the first tank, thereby augmenting the aerobic biomass in the first tank.

41. A microprocessor-controlled apparatus for aerobic treatment of wastewater containing organic matter, comprising:

an intermediate tank receiving a continuous flow of wastewater so that the wastewater undergoes aerobic treatment to create an aerobic biomass in the intermediate tank;

an aerator-clarifier tank;

first liquid transfer means including an inlet for withdrawing wastewater material from the intermediate tank and transferring that material to the aerator-clarifier tank so that the wastewater undergoes further aerobic treatment and clarification in the aerator-clarifier tank;

second liquid transfer means including an inlet to withdraw a supernatant layer of liquid from the aerator-clarifier tank and transfer the removed liquid for subsequent dispersal;

third liquid transfer means including an inlet for withdrawing material at the bottom of the aerator-clarifier tank and transferring that material to the intermediate tank; and a microprocessor operatively associated with the first, second, and third liquid transfer means and programmed to form means to transfer a predetermined batch of wastewater from the intermediate tank to the aerator-clarifier tank via the first means; means to clarify the batch of wastewater in the aerator-clarifier tank by allowing the wastewater to settle so that sludge in the wastewater settles to the bottom of the aerator-clarifier tank and a supernatant liquid from the wastewater, means for transferring a quantity of the settled sludge from the aerator-clarifier tank to the intermediate tank via the third liquid transfer means at periodic intervals during the clarification before the sludge begins to undergo denitrification in the aerator-clarifier tank; means to transfer the supernatant liquid from the aerator-clarifier tank via the second means for dispersal; means to transfer to the intermediate tank via the third liquid transfer means the settled sludge remaining in the aerator-clarifier tank at the end of clarification, and means to transfer no wastewater to the aerator-clarifier tank during operation of the means to clarify, the means to transfer supernatant liquid, and the means to transfer settled sludge, so that the batch of wastewater undergoes treatment in the aerator-clarifier tank without disturbance or dilution by additional wastewater so that the returned sludge combines with organic matter in the wastewater entering the intermediate tank from the settling tank, thereby augmenting the aerobic biomass in the intermediate tank.

42. A microprocessor-controlled apparatus for aerobic treatment of wastewater containing organic matter, comprising:

an intermediate tank receiving a continuous flow of wastewater so that the wastewater undergoes aerobic treatment to create an aerobic biomass in the intermediate tank;

an aerator-clarifier tank;

first liquid transfer means including an inlet for withdrawing wastewater material from the intermediate tank and transferring that material to the aerator-clarifier tank so that the wastewater undergoes further aerobic treatment and clarification in the aerator-clarifier tank;

second liquid transfer means including on inlet to withdraw a supernatant layer of liquid from the aerator-clarifier tank and transfer the removed liquid for subsequent dispersal;

third liquid transfer means including an inlet for withdrawing material at the bottom of the aerator-clarifier tank and transferring that material to the intermediate tank;

a microprocessor operatively associated with the first, second, and third liquid transfer means and programmed to form means to transfer a predetermined batch of wastewater from the intermediate tank to the aerator-clarifier tank via the first means, means to clarify the batch of wastewater in the aerator-clarifier tank by allowing the wastewater to settle so that sludge in the wastewater settles to the bottom of the aerator-clarifier tank and a supernatant liquid from the wastewater, means for transferring a quantity of the settled sludge from the aerator-clarifier tank to the intermediate tank via the third liquid transfer means at periodic intervals during the clarification before the sludge begins to undergo denitrification in the aerator-clarifier tank, means to transfer the supernatant liquid from the aerator-clarifier tank via the second means for dispersal, and means to transfer to the intermediate tank via the third liquid transfer means the settled sludge remaining in the aerator-clarifier tank at the end of clarification, so that the returned sludge combines with organic matter in the wastewater entering the intermediate tank from the settling tank, thereby augmenting the aerobic biomass in the intermediate tank; and the microprocessor is further programmed to form means to repeat the steps of allowing the wastewater to settle in the aerator-clarifier tank, periodically transferring a quantity of settled sludge to the intermediate tank before denitrification begins, and transferring supernatant liquid from the aerator-clarifier tank at least once before transferring the remaining settled sludge from the aerator-clarifier tank to the intermediate tank.

\* \* \* \* \*